United States Patent
Syed et al.

(10) Patent No.: US 11,226,668 B2
(45) Date of Patent: Jan. 18, 2022

(54) LOW POWER TOUCH SENSING DURING A SLEEP STATE OF AN ELECTRONIC DEVICE

(71) Applicant: Apple Inc., Cupertino, CA (US)

(72) Inventors: Taif A. Syed, Cupertino, CA (US); Bingrui Yang, Cupertino, CA (US); Christopher Tenzin Mullens, San Francisco, CA (US); Sumant Ranganathan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/180,537

(22) Filed: Feb. 19, 2021

(65) Prior Publication Data

US 2021/0173466 A1    Jun. 10, 2021

Related U.S. Application Data

(63) Continuation of application No. 15/690,565, filed on Aug. 30, 2017, now Pat. No. 10,928,881.
(Continued)

(51) Int. Cl.
*G06F 1/3215* (2019.01)
*G06F 1/3234* (2019.01)
(Continued)

(52) U.S. Cl.
CPC .......... *G06F 1/3215* (2013.01); *G06F 1/3262* (2013.01); *G06F 3/0443* (2019.05);
(Continued)

(58) Field of Classification Search
CPC ..................... G06F 1/3215; G06F 3/04166
See application file for complete search history.

(56) References Cited

U.S. PATENT DOCUMENTS 5,483,261 A   1/1996   Yasutake
5,488,204 A   1/1996   Mead et al.
(Continued)

FOREIGN PATENT DOCUMENTS

CN   202976038 U   6/2013
CN   104662488 A   5/2015
(Continued)

OTHER PUBLICATIONS

Corrected Notice of Allowance received for U.S. Appl. No. 15/701,223, dated Sep. 4, 2019, 4 pages.
(Continued)

*Primary Examiner* — William Boddie
*Assistant Examiner* — Andrew B Schnirel
(74) *Attorney, Agent, or Firm* — Kubota & Basol LLP

(57) ABSTRACT

An electronic device is disclosed. The electronic device can sense touch on its touch screen while in a sleep state in a manner that allows the electronic device to respond to certain touch inputs, while consuming less power due to touch sensing than while in an awake state. For example, sensing touch during the sleep state can allow the electronic device to wake (e.g., transition from the sleep state to the awake state) in response to detecting a certain touch input (e.g., a tap or other touch input) on its touch screen while in the sleep state. Various ways for the electronic device to sense touch during the sleep state are disclosed.

24 Claims, 10 Drawing Sheets

Related U.S. Application Data

(60) Provisional application No. 62/551,002, filed on Aug. 28, 2017, provisional application No. 62/399,215, filed on Sep. 23, 2016.

(51) Int. Cl.
*G06F 3/041* (2006.01)
*G06F 3/044* (2006.01)

(52) U.S. Cl.
CPC .............. *G06F 3/04166* (2019.05); *G06F 2203/04104* (2013.01); *G06F 2203/04108* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,375,535 | B1 | 5/2008 | Kutz et al. |
| 7,663,607 | B2 | 2/2010 | Hotelling et al. |
| 8,479,122 | B2 | 7/2013 | Hotelling et al. |
| 8,773,146 | B1 | 7/2014 | Hills et al. |
| 9,001,072 | B2 | 4/2015 | Sobel et al. |
| 9,395,859 | B1 | 7/2016 | Tate et al. |
| 2006/0197753 | A1 | 9/2006 | Hotelling |
| 2009/0066665 | A1 | 3/2009 | Lee |
| 2011/0063993 | A1* | 3/2011 | Wilson ............... H04M 11/062 370/254 |
| 2011/0157068 | A1 | 6/2011 | Parker et al. |
| 2011/0254802 | A1* | 10/2011 | Philipp ............... G06F 3/04184 345/174 |
| 2012/0050216 | A1 | 3/2012 | Kremin et al. |
| 2012/0062482 | A1 | 3/2012 | Ding et al. |
| 2013/0076648 | A1 | 3/2013 | Krah et al. |
| 2013/0207913 | A1 | 8/2013 | Takashima et al. |
| 2014/0146008 | A1 | 5/2014 | Miyahara et al. |
| 2014/0184518 | A1 | 7/2014 | Valavi |
| 2014/0253497 | A1 | 9/2014 | Chen et al. |
| 2015/0234446 | A1 | 8/2015 | Nathan et al. |
| 2016/0026335 | A1* | 1/2016 | Ahn .................. G06F 3/044 345/173 |
| 2016/0034117 | A1* | 2/2016 | Kim .................. G06F 1/3262 715/771 |
| 2016/0152102 | A1 | 6/2016 | Campbell |
| 2016/0162011 | A1* | 6/2016 | Verma ............... G06F 3/041661 345/173 |
| 2016/0162102 | A1 | 6/2016 | Shahparnia et al. |
| 2016/0216836 | A1 | 7/2016 | Yao et al. |
| 2017/0090619 | A1 | 3/2017 | Yousefpor et al. |
| 2018/0088733 | A1 | 3/2018 | Syed et al. |
| 2019/0079576 | A1 | 3/2019 | Liu et al. |

FOREIGN PATENT DOCUMENTS

| | | |
|---|---|---|
| CN | 104932811 A | 9/2015 |
| CN | 105677074 A | 6/2016 |
| EP | 2741184 A2 | 6/2014 |
| JP | 2000-163031 A | 6/2000 |
| JP | 2002-342033 A | 11/2002 |
| KR | 10-2011-0133853 A | 12/2011 |
| KR | 10-2014-0072804 A | 6/2014 |
| TW | 201435691 A | 9/2014 |

OTHER PUBLICATIONS

Final Office Action received for U.S. Appl. No. 15/690,565, dated Dec. 12, 2019, 35 pages.
Non-Final Office Action received for U.S. Appl. No. 15/690,565, dated Aug. 28, 2019, 31 pages.
Non-Final Office Action received for U.S. Appl. No. 15/701,223, dated Nov. 28, 2018, 10 pages.
Non-Final Office Action received for U.S. Appl. No. 15/690,565, dated May 13, 2020, 41 pages.
Notice of Allowance received for U.S. Appl. No. 15/701,223, dated May 28, 2019, 8 pages.
Notice of Allowance received for U.S. Appl. No. 15/690,565, dated Dec. 2, 2020, 12 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Search Report received for Chinese Patent Application No. 202110072251.0, dated Jun. 28, 2021, 3 pages (1 page of English Translation and 2 page of Official Copy).
Search Report received for Chinese Patent Application No. 202110072247.4, dated Aug. 24, 2021, 4 pages (2 page of English Translation and 2 pages of Official Copy).

\* cited by examiner

LOW POWER TOUCH SENSING DURING A SLEEP STATE OF AN ELECTRONIC DEVICE

CROSS-REFERENCE TO RELATED APPLICATIONS

This application is a continuation of U.S. patent application Ser. No. 15/690,565 (published as U.S. Publication No. 2018/0088733), filed on Aug. 30, 2017, which claims benefit of U.S. Provisional Patent Application No. 62/551,002, filed on Aug. 28, 2017, and U.S. Provisional Patent Application No. 62/399,215, filed Sep. 23, 2016, which are hereby incorporated by reference in their entirety for all purposes.

FIELD OF THE DISCLOSURE

This relates generally to touch sensor panels, and more particularly, to sensing touch during a sleep state of an electronic device that includes a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

In some examples, the touch screens of the disclosure can be included in an electronic device, such as a mobile phone, a tablet computer or a wearable device. It can be beneficial for the electronic device to sense touch on its touch screen while in a sleep state in a manner that allows the electronic device to respond to certain touch inputs, while consuming less power due to touch sensing than while in an awake state. For example, sensing touch during the sleep state can allow the electronic device to wake (e.g., transition from the sleep state to the awake state) in response to detecting a certain touch input (e.g., a tap or other touch input) on its touch screen while in the sleep state. The examples of the disclosure provide various ways for the electronic device to sense touch during the sleep state.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). In some examples, the touch screens of the disclosure can be included in an electronic device, such as a mobile phone, a tablet computer or a wearable device. It can be beneficial for the electronic device to sense touch on its touch screen while in a sleep state in a manner that allows the electronic device to respond to certain touch inputs, while consuming less power due to touch sensing than while in an awake state. For example, sensing touch during the sleep state can allow the electronic device to wake (e.g., transition from the sleep state to the awake state) in response to detecting a certain touch input (e.g., a tap or other touch input) on its touch screen while in the sleep state. The examples of the disclosure provide various ways for the electronic device to sense touch during the sleep state.

Figure 1A:
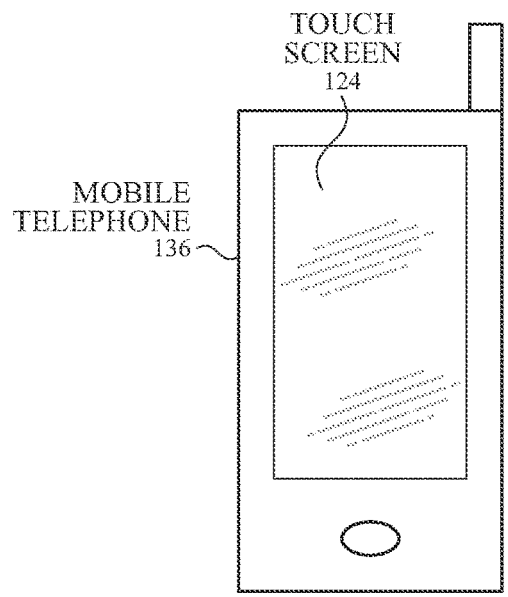
FIGS. 1A-1D illustrate an example mobile telephone, an example media player, an example personal computer and an example tablet computer that can each include an exemplary touch screen according to examples of the disclosure.
Figure 1B:
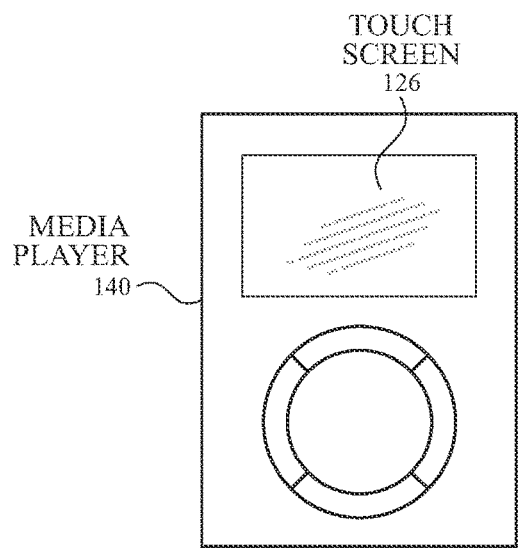
Figure 1C:
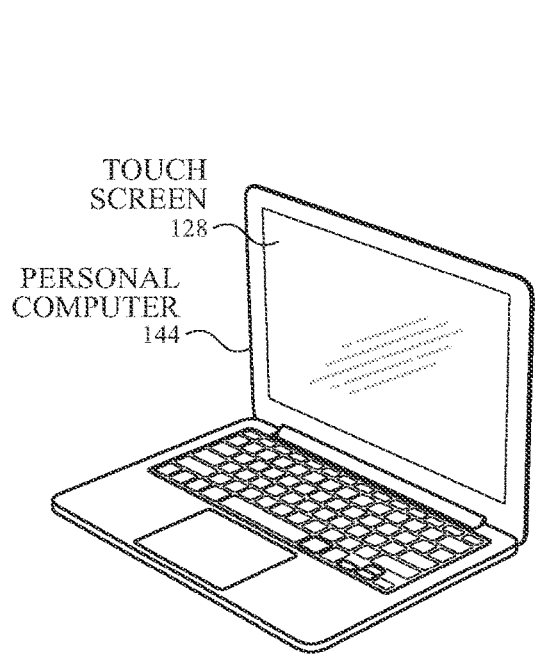
Figure 1D:
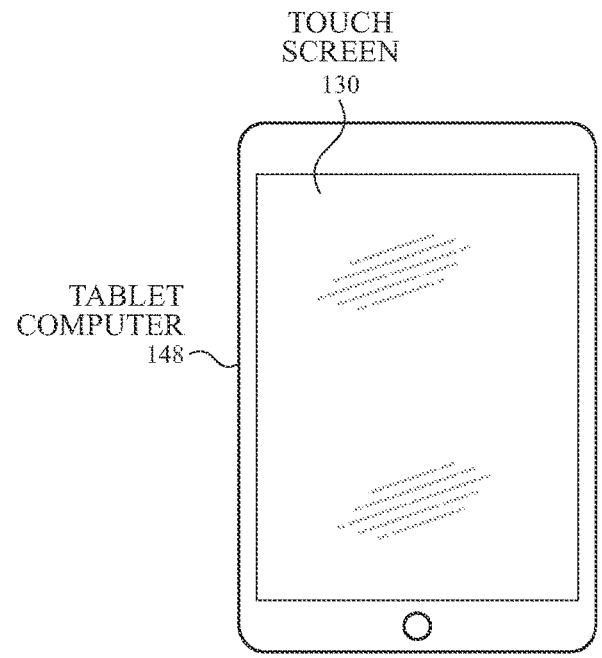

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
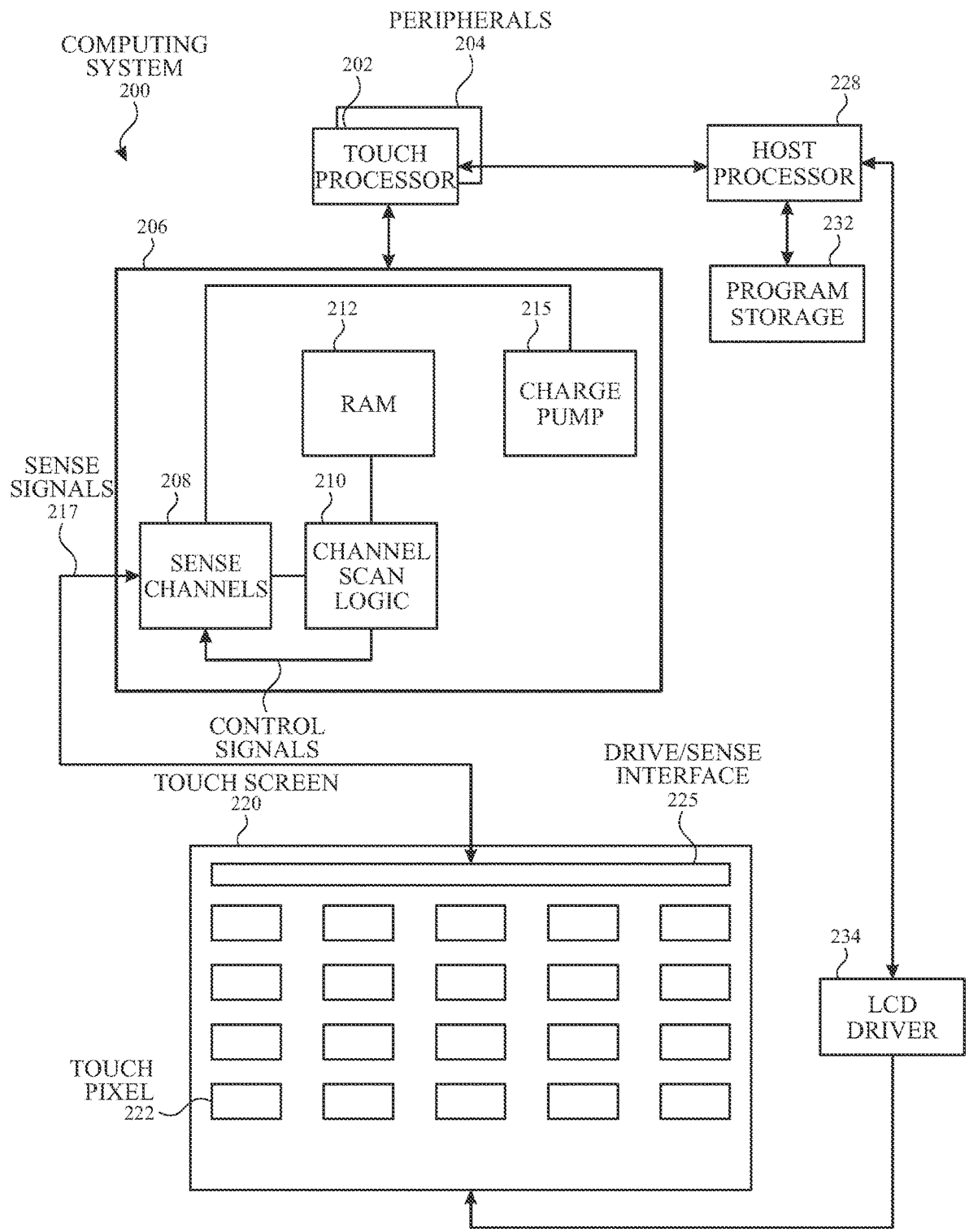
FIG. 2 is a block diagram of an example computing system that illustrates one implementation of an example touch screen according to examples of the disclosure.

FIG. 2 is a block diagram of an example computing system 200 that illustrates one implementation of an example self-capacitance touch screen 220 according to examples of the disclosure. It is understood that computing system 200 can instead analogously include a mutual capacitance touch screen. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
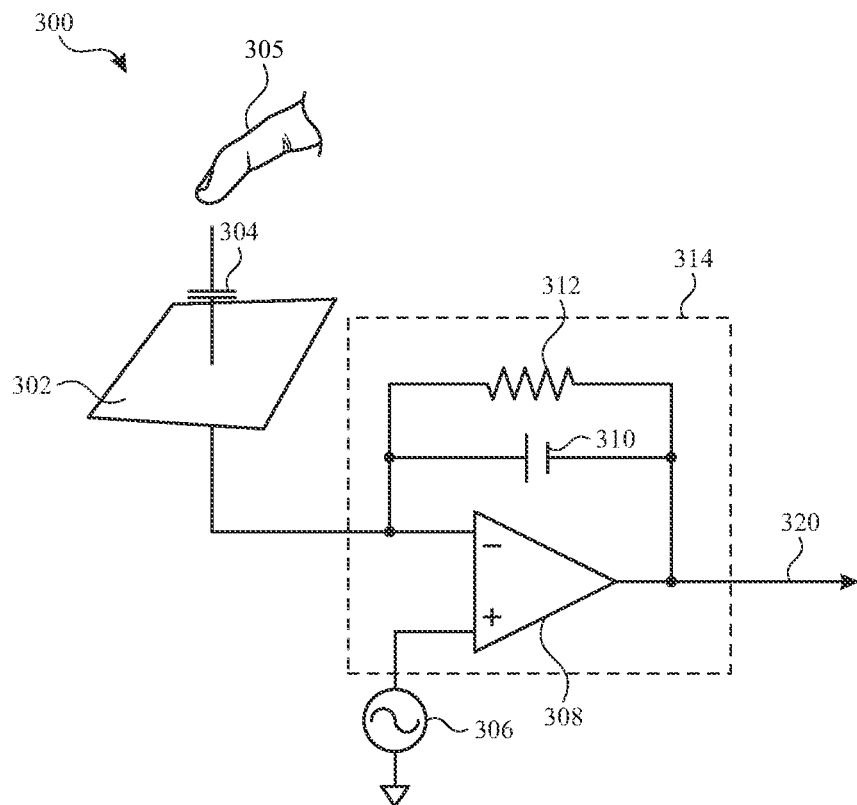
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
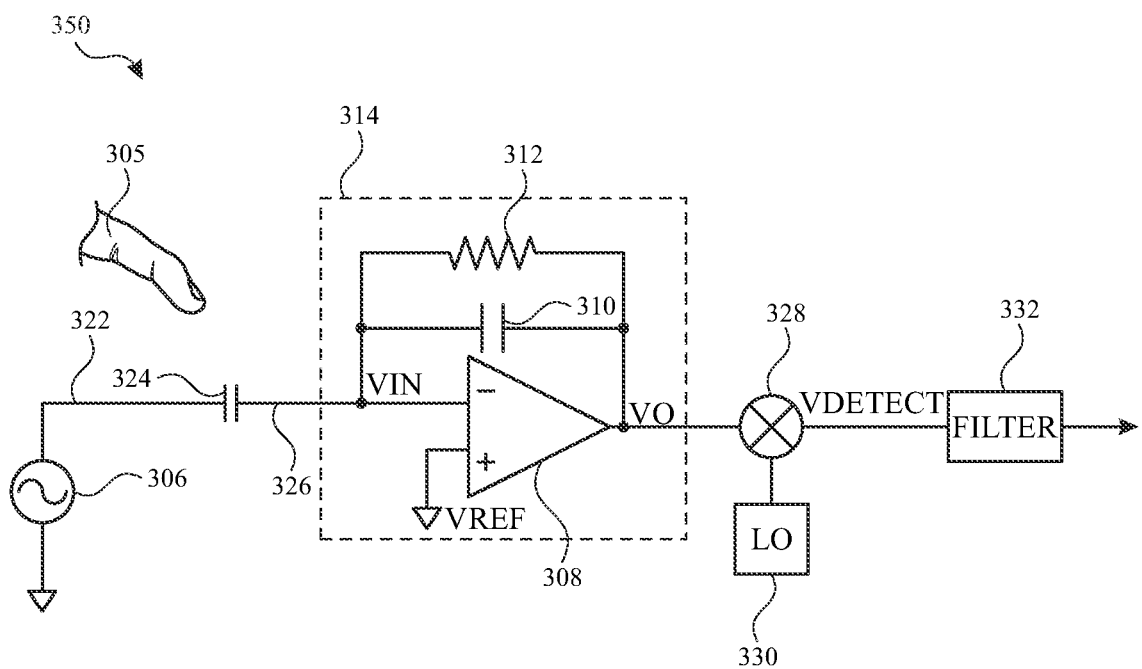
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to mutual-capacitance drive 322 and sense 326 lines and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., organic light emitting diode (OLED) displays, plasma display panel (PDP) displays, electroluminescent displays (ELD), light-emitting diode (LED) displays, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
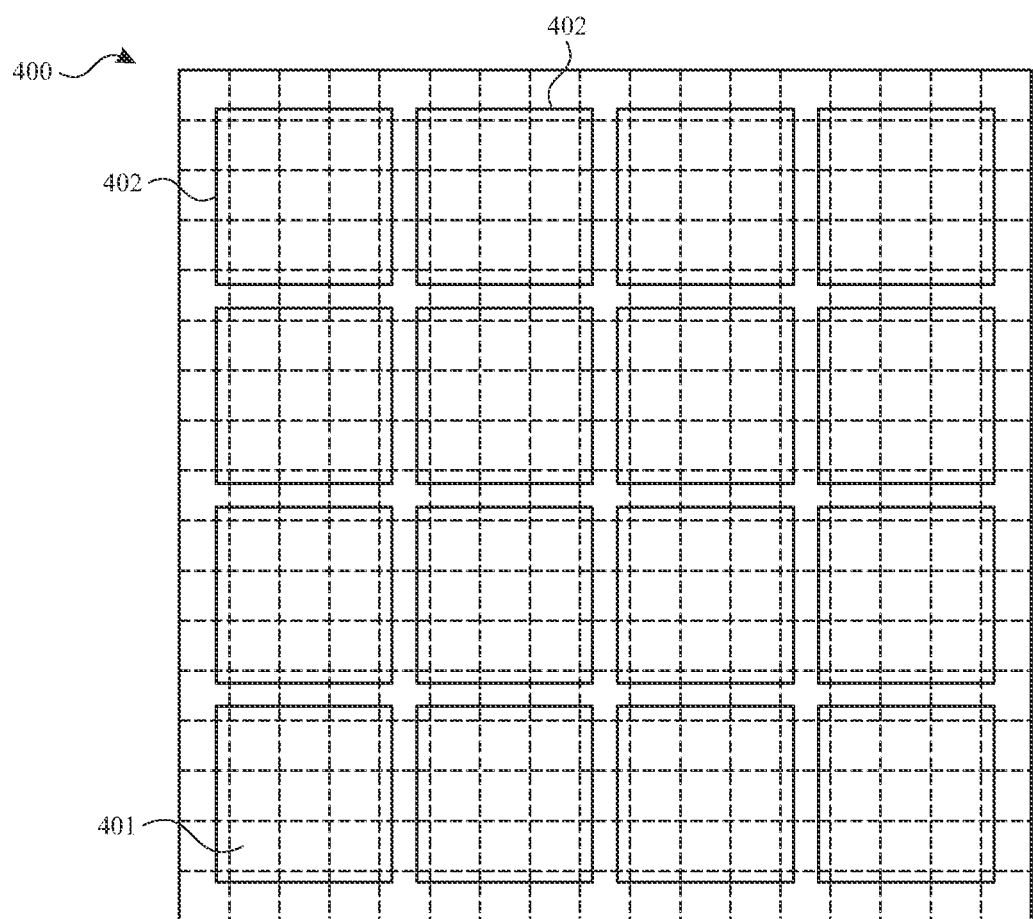
FIG. 4 illustrates an example configuration in which common electrodes can form portions of the touch sensing circuitry of a touch sensing system according to examples of the disclosure.

FIG. 4 illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 can include a plurality of display pixels 401, and each display pixel 401 can include a portion of a common electrode 402, which can be a circuit element of the display system circuitry in the display pixel stackup (i.e., the stacked material layers forming the display pixels) of the display pixels of some types of LCDs or other displays (e.g., organic light emitting diode (OLED) displays, plasma display panel (PDP) displays, electroluminescent displays (ELD), light-emitting diode (LED) displays, etc.)—in other words, the common electrodes can operate as part of the display system to display a display image on touch screen 400. While FIG. 4 illustrates a pixelated touch screen 400 (e.g., a pixelated self-capacitance touch screen), it is understood that drive and/or sense electrodes of a mutual capacitance touch screen can function as common electrodes of an integrated touch screen in an analogous manner to common electrodes 402 in touch screen 400.

In the example shown in FIG. 4, each common electrode 402 can serve as a multi-function circuit element that can operate as display circuitry of the display system of touch screen 400 and can also operate as touch sensing circuitry of the touch sensing system. Specifically, each common electrode 402 can operate as a common electrode of the display circuitry of the touch screen 400 (e.g., during a display phase), as described above, and can also operate as a touch node electrode of the touch sensing circuitry of the touch screen (e.g., during a touch sensing phase). Other circuit elements of touch screen 400 can also form part of the touch sensing circuitry. More specifically, in some examples, during the touch sensing phase, a gate line can be connected to a power supply, such as a charge pump, that can apply a voltage to maintain TFTs in display pixels included in a common electrode 402 in an "off" state. Stimulation signals can be applied to the common electrode 402. Changes in the total self-capacitance of the common electrode 402 can be sensed through one or more operational amplifiers, as previously discussed. The changes in the total self-capacitance of the common electrode 402 can depend on the proximity of an object, such as finger 305, to the common electrode. In this way, the measured changes in total self-capacitance of the common electrode 402 can provide an indication of touch on or near the touch screen. A mutual capacitance touch screen can similarly be implemented in which common electrodes can form portions of the touch sensing circuitry of the mutual capacitance touch screen. For example the common electrodes can form drive or sense lines used to detect a touch image on the touch screen, as described above.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

Figure 5:
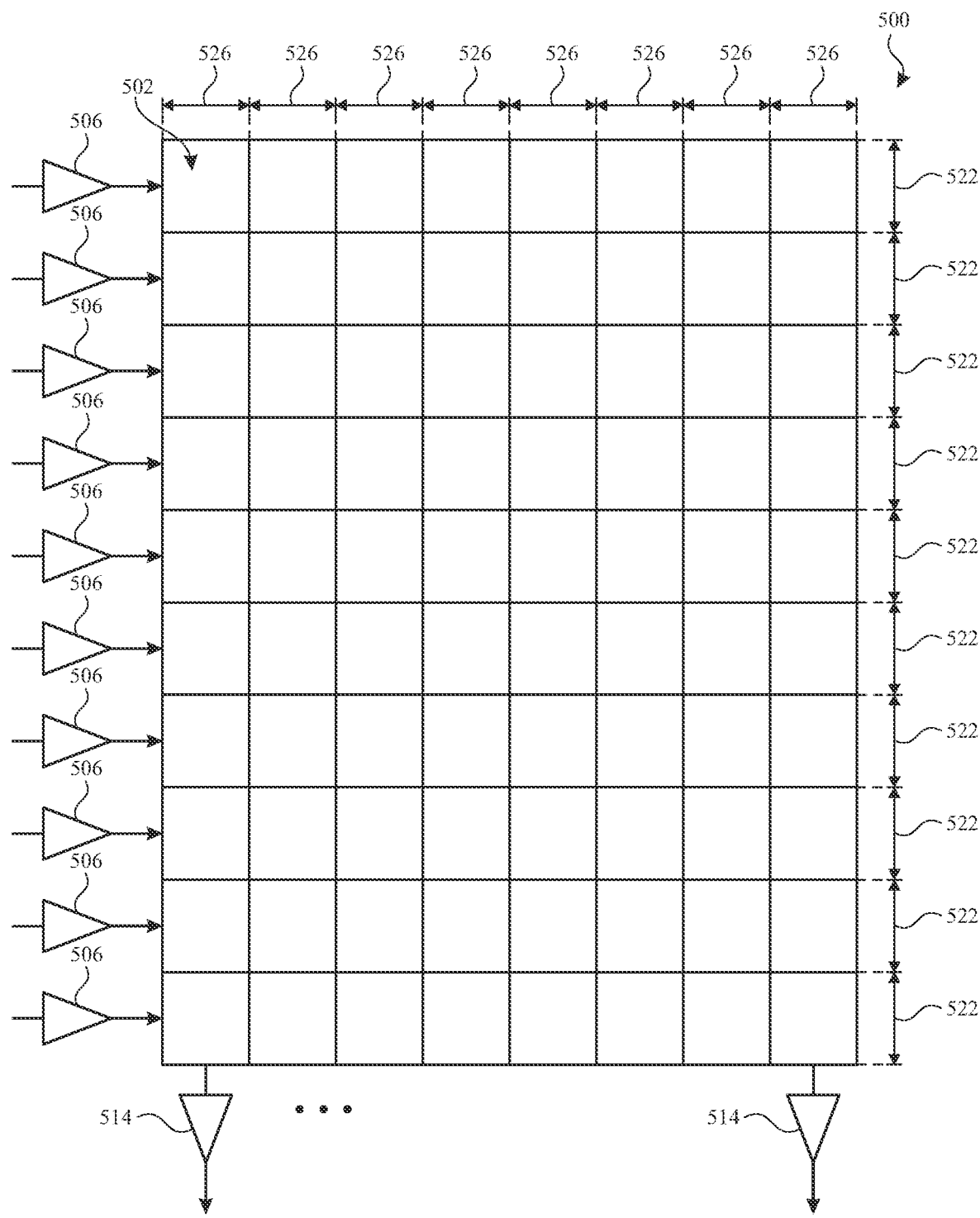
FIG. 5 illustrates an exemplary mutual capacitance touch screen configuration according to examples of the disclosure.

As previously mentioned, in some examples, a touch screen of the disclosure can be a mutual capacitance touch screen. FIG. 5 illustrates an exemplary mutual capacitance touch screen 500 configuration according to examples of the disclosure. Touch screen 500 can include row electrodes 522 and column electrodes 526 that intersect with row electrodes 522. In some examples, row electrodes 522 can be drive electrodes of mutual capacitance touch screen 500 (e.g., corresponding to drive lines 322 in FIG. 3B), and column electrodes 526 can be sense electrodes of mutual capacitance touch screen 500 (e.g., corresponding to sense lines 326 in FIG. 3B)—as such, row electrodes 522 can be referred to as drive electrodes, and column electrodes 526 can be referred to as sense electrodes. The intersections of drive electrodes 522 and sense electrodes 526 can form touch nodes 502, which can each represent a position on touch screen 500 at which an amount of touch can be sensed to capture a "touch image" at touch screen 500. In some examples, drive electrodes 522 can be driven by corresponding drive circuitry 506 (also referred to as "transmit channels," and corresponding to stimulation signal 306 in FIG. 3B), and sense electrodes 526 can be sensed by corresponding sense circuitry 514 (also referred to as "receive channels," and corresponding to sensing circuit 314 in FIG. 3B) to capture the "touch image" at touch screen, as described previously in this disclosure. In some examples, drive circuitry 506 can include any suitable circuitry for driving drive electrodes 522 with a stimulation signal (e.g., an AC voltage), such as an operational amplifier.

In some examples, the touch screens of the disclosure can be included in an electronic device, such as a mobile phone, a tablet computer or a wearable device. When the electronic device is in an awake state (e.g., a state in which its display and/or other components are turned on), the electronic device can sense touch on its touch screen in the manners described above. When the electronic device is in a sleep state (e.g., a low-power state in which its display and/or other components are turned off), in some examples, the electronic device may not sense touch on its touch screen; for example, the electronic device may turn off its drive and/or sense circuitry (e.g., as described in FIGS. 3A-3B) while in the sleep state to conserve power. However, in some examples, it can be beneficial for the electronic device to sense touch on its touch screen while in the sleep state in a manner that allows the electronic device to respond to certain touch inputs, while consuming less power due to touch sensing than while in the awake state. For example, sensing touch during the sleep state can allow the electronic device to wake (e.g., transition from the sleep state to the awake state) in response to detecting a certain touch input (e.g., a tap or other touch input) on its touch screen while in the sleep state. In some examples, the electronic device may only wake in response to detecting certain touch inputs (e.g., a tap) during the sleep state, and may not wake in response to detecting other touch inputs (e.g., a swipe, or a long press) during the sleep state. The examples of the disclosure provide various ways for the electronic device to sense touch during the sleep state. It should be noted that the examples of the disclosure will be provided in the context of a touch screen, but it is understood that the examples of the disclosure can similarly be implemented in the context of a touch sensor panel.

While the examples of the disclosure are described as occurring during a "sleep state" or an "awake state" of the electronic device, in some examples, the electronic device can have more than two states of operation. For example, the electronic device can have an active state and a plurality of low-power states, each corresponding to and defining a different manner of operation for the electronic device. In the active state, a display of the electronic device (e.g., the display component of the touch screen of the electronic device) can be active (e.g., displaying one or more images), and processing circuitry associated with sensing touch on the touch screen of the electronic device can be operating at a given state of readiness (e.g., touch controller 206 and/or touch processor 202 can be powered on at full power operation). In some examples, such an active state can correspond to the "awake state" described in this disclosure.

During a first low-power state (or a plurality of first low-power states) of the electronic device, some of the processing circuitry associated with sensing touch on the touch screen of the electronic device can be disabled or in a reduced-activity/reduced-power state (e.g., touch controller 206 and/or touch processor 202 can be disabled or in reduced-power operation), though the display of the electronic device (e.g., the display component of the touch screen of the electronic device) can remain active. In some examples, the electronic device can transition from the active state to the first low-power state in response to detecting an amount of touch on the touch screen that is less than a first threshold amount of touch for longer than a first threshold time.

During a second low-power state (or a plurality of second low-power states) of the electronic device, some of the processing circuitry associated with sensing touch on the touch screen of the electronic device can be disabled or in a reduced-activity/reduced-power state (e.g., touch controller 206 and/or touch processor 202 can be disabled or in reduced-power operation), and some additional hardware in the electronic device can additionally be disabled or in a reduced-activity/reduced-power state (e.g., this additional hardware could have been enabled or in a normal-activity/normal-power state during the first low-power state). In the second low-power state, the display of the electronic device (e.g., the display component of the touch screen of the electronic device) can be disabled. In some examples, the electronic device can transition from the first low-power state to the second low-power state in response to detecting an amount of touch on the touch screen that is less than a second threshold amount of touch for longer than a second threshold time. Additionally or alternatively, the electronic device can enter the second low-power state (e.g., from the first low-power state or the active state) in response to a command received from the system or from a user of the electronic device. For example, the user can press a specific button on the electronic device, or can completely cover, with their hand, the touch screen of the electronic device, to transition the electronic device to the second low-power state. In some examples, such a second low-power state can correspond to the "sleep state" described in this disclosure. Further, in some examples, the second low-power state can include a plurality of sub-states depending on whether certain hardware components of the electronic device are operating; for example, if the electronic device is playing audio through speakers, the electronic device can be in a first sub-state of the second low-power state, and if the electronic device is playing the audio through headphones/a headphone jack rather than the speakers, the electronic device can be in a second sub-state of the second low-power state. The state/sub-state in which the electronic device is currently operating (e.g., the active state, the first low-power state, the second low-power state and/or the sub-states of the second low-power state) can impact various aspects of touch scanning performed by the electronic device, as will be described in this disclosure. Further, any of the examples of the disclosure that are described herein as occurring during the "sleep state" can occur during one or more of the low-power states described above (e.g., the first low-power state, the second low-power state, specific sub-states of the second low-power state, etc.), and any of the examples of the disclosure that are described herein as occurring during the "awake state" can occur during the active state described above.

Figure 6A:
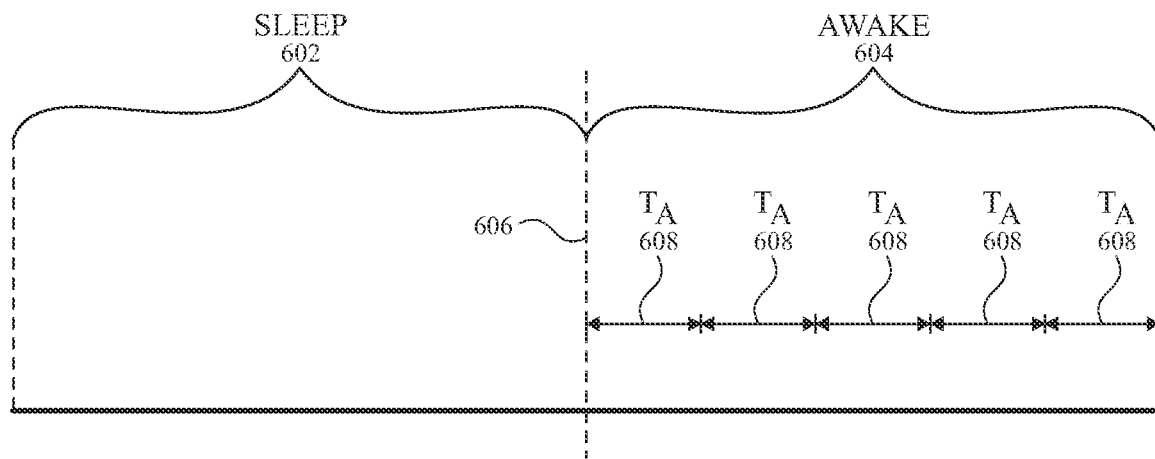
FIGS. 6A-6B illustrate exemplary touch sensing activity at an electronic device according to examples of the disclosure.
Figure 6B:
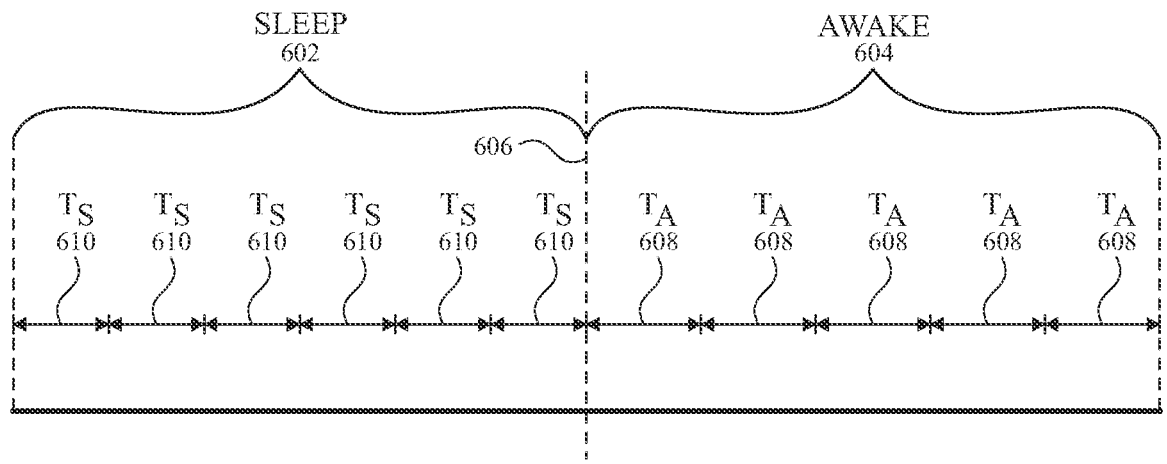

FIGS. 6A-6B illustrate exemplary touch sensing activity at an electronic device according to examples of the disclosure. In FIG. 6A, during sleep state 602, the electronic device may not perform any touch sensing at its touch screen, as described above. When the electronic device transitions to awake state 604 (e.g., at transition 606 corresponding to some input at the electronic device for waking the electronic device, other than a touch input on its touch screen), the electronic device can perform touch sensing at its touch screen during touch frames $T_A$ 608. Touch frames $T_A$ 608 can correspond to periods of time during which the electronic device can perform one or more touch sensing-related functions, such as driving drive electrodes and/or sensing sense electrodes on the touch screen of the electronic device.

In FIG. 6B, the electronic device can perform touch sensing at its touch screen during awake state 604 as described with reference to FIG. 6A. However, during sleep state 602, instead of not performing touch sensing as in FIG. 6A, the electronic device can perform touch sensing at its touch screen during touch frames $T_S$ 610. Touch frames $T_S$ 610 can be the same or different than touch frames $T_A$ 608 (e.g., the touch sensing-related functions that the electronic device performs during touch frames $T_S$ 610 can be the same or different than the touch sensing-related functions that the electronic device performs during touch frames $T_A$ 608). Because the electronic device in FIG. 6B can perform touch sensing during sleep state 602, the electronic device can sense touch on its touch screen during sleep state 602, and transition 606 can correspond to a touch input (e.g., a tap) on the touch screen of the electronic device for waking the electronic device. This disclosure provides various exemplary details of touch frames $T_S$ 610 and/or how they can compare to touch frames $T_A$ 608, below. It should be noted that the examples of the disclosure have been provided in the context of a touch screen, but it is understood that the examples of the disclosure can similarly be implemented in the context of a touch sensor panel. Further, awake state 604 can correspond to an active state of the electronic device, and sleep state 602 can correspond to a first low-power state or a second low-power state of the electronic device, in situations in which the electronic device has an active state and a plurality of low-power states, as previously described.

Figure 7:
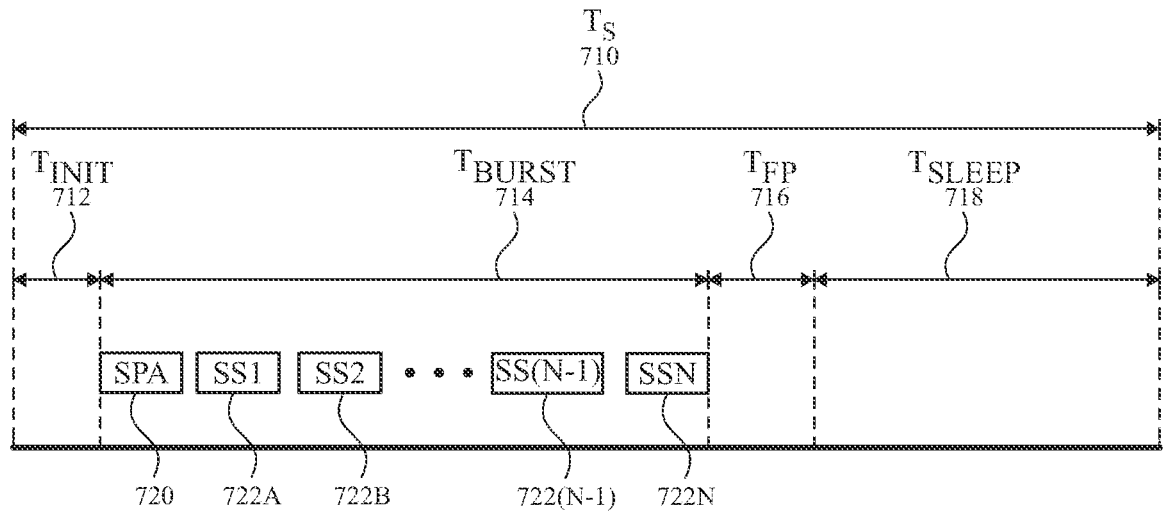
FIG. 7 illustrates an exemplary touch frame of an electronic device in a sleep state according to examples of the disclosure.

FIG. 7 illustrates an exemplary touch frame $T_S$ 710 of an electronic device in a sleep state according to examples of the disclosure. Touch frame $T_S$ 710 can correspond to touch frames $T_S$ 610 in FIG. 6B, and can include a plurality of sub-frames. Specifically, touch frame $T_S$ 710 can include initialization frame $T_{init}$ 712 during which various touch-related circuitry in the touch screen can be initialized and prepared for touch scanning. For example, a touch processor and/or controller (e.g., 202 and 206 in FIG. 2), drive circuitry (e.g., 306 in FIG. 3B) and/or sense circuitry (e.g., 314 in FIGS. 3A-3B) can be initialized during $T_{init}$ 712.

Touch frame $T_S$ 710 can also include touch measurement frame $T_{burst}$ 714 during which touch can be sensed on the touch screen. In some examples $T_{burst}$ 714 can follow immediately after $T_{init}$ 712, though other configurations are also possible. During $T_{burst}$ 714, the electronic device can perform active hardware-based scanning of its touch screen to collect touch data. In some examples, $T_{burst}$ 714 can include a number of scan steps. For example, $T_{burst}$ 714 can include a spectral analysis scan step SPA 720 during which the electronic device can scan its touch screen with different touch sensing signals having different frequencies in order to determine one or more frequencies at which touch sensing can be least affected by noise. Based on the results of SPA 720, the electronic device can scan for touch at its touch screen during scan steps SS1 722A, SS2 722B, SS(N-1) 722(N-1) and SSN 722N (referred to collectively as scan steps 722). During scan steps 722, the electronic device can scan its touch screen for touch using the one or more frequencies that it identified as low-noise frequencies during SPA 720. For example, during SS1 722A, the electronic device can, using drive circuitry 506 in FIG. 5, stimulate drive electrodes 522 with a first set of stimulation signals while sensing sense electrodes 526 using sense circuitry 514. Similarly, during SS2 722B, the electronic device can, using drive circuitry 506 in FIG. 5, stimulate drive electrodes 522 with a second set of stimulation signals while sensing sense electrodes 526 using sense circuitry 514. After N scan steps, the electronic device can have sensed sufficient touch data (e.g., via sense circuitry 514) to determine an image of touch on its touch screen. In some examples, the number of scan steps 722 can correspond to the number of discrete drive circuitry (or transmit channels) or drive electrodes 522 included in the touch screen; for example, in FIG. 5, touch screen 500 can include ten transmit channels 506 and ten corresponding drive electrodes 522, and $T_S$ 710 can include ten scan steps 722 that correspond, respectively, to those ten transmit channels 506 and ten drive electrodes 522.

During $T_{fp}$ 716, the electronic device can process the touch data collected during scan steps 722 to determine whether a particular touch input for waking the electronic device has been detected on the touch screen. For example, the electronic device can determine whether a tap has been detected on the touch screen. If the particular touch input for waking the electronic device has been detected on the touch screen, the electronic device can transition to the awake state (e.g., as described with reference to FIG. 6B). If the particular touch input for waking the electronic device was not detected on the touch screen (e.g., no touch input was detected on the touch screen, or the touch input that was detected on the touch screen is not the particular touch input for waking the electronic device), the electronic device can remain in the sleep state, and the remainder of touch frame $T_S$ 710 can comprise sleep frame $T_{sleep}$ 718 during which no touch sensing may be performed on the touch screen. The electronic device can then sense touch at its touch screen in accordance with $T_S$ 710 when the next touch frame $T_S$ is executed.

In some examples, the lengths of scan steps 722 (i.e., the "integration time") in touch frames $T_S$ 710 during the sleep state can be shorter than the lengths of corresponding scan steps that can be included in touch frames $T_A$ 608 in the awake state. Specifically, touch sensing during the sleep state of the electronic device (e.g., to detect a predetermined gesture to wake the electronic device, such as a tap) may not require as much accuracy and/or may not be as impacted by noise as touch sensing during the awake state. Therefore, scan steps in the sleep state can be shorter than scan steps in the awake state while maintaining satisfactory touch sensing performance. For example, touch frames $T_A$ 608 in the awake state of the electronic device can include the same number of scan steps for sensing touch on the touch screen as do touch frames $T_S$ 710 in the sleep state of the electronic device, and can, like in the sleep state, correspond to the number of discrete drive circuitry (or transmit channels) and/or drive electrodes 522 included in the touch screen. Thus, in some examples, each scan step in the awake state can have a corresponding scan step in the sleep state, the scan details of which can be the same (e.g., scan steps during which the same drive circuitry is operated). However, as mentioned above, in some examples, the lengths of the scan steps in the awake state can be longer (e.g., 150 µs) than the lengths of the scan steps 722 in touch frames $T_S$ 710 in the sleep state (e.g., 20 µs, 50 µs). In this way, power consumption for touch sensing during the sleep state can be reduced while maintaining the ability to detect the predetermined gesture (e.g., a tap) on the touch screen to wake the electronic device. In some examples, the length of each scan step 710 in the sleep state can be shorter than the length of each scan step in the awake state. In some examples, the average length of the scan steps in the sleep state can be shorter than the average length of the scan steps in the awake state. In some examples, the length of a given scan step in the sleep state can be shorter than the length of that same corresponding scan step in the awake state (e.g., the first scan step in the sleep state can be shorter than the first scan step in the awake state, the second scan step in the sleep state can be shorter than the second scan step in the awake state, etc.) In examples in which the electronic device has an active state and a plurality of low-power states, as previously described, scan steps in the second low-power state can be shorter than scan steps in the first low-power state, which can be shorter than scan steps in the active state, analogous to as described above.

In some examples, the electronic device can dynamically alter the lengths of scan steps 722 in touch frame $T_S$ 710 during the sleep state (and/or during the first low-power state, the second low-power state, etc., in situations in which the electronic device has an active state and a plurality of low-power states, as previously described). For example, initially, the electronic device can utilize scan steps 722 that have an initial, short length, such as 20 μs (e.g., shorter than the length of scan steps in the awake state). Using these scan steps 722 with the initial, short lengths, the electronic device can sense touch on its touch screen in the sleep state. In some examples, if touch activity is detected on the touch screen, the electronic device can increase the lengths of scan steps 722 to a value that is greater than the initial, short length to improve its ability to determine whether the touch activity is a tap or other input for waking the device (e.g., from 20 us to 50 μs, or from 20 us to a length that is equal to or greater than the length of scan steps in the awake state). Using these scan steps 722 with increased lengths, the electronic device can sense touch on its touch screen until it determines whether to transition to the awake state in response to the touch activity.

In some examples, the electronic device can evaluate the signal-to-noise ratio of the resulting touch data before increasing the lengths of scan steps 722. Specifically, as above, the electronic device can initially utilize scan steps 722 that have an initial, short length, such as 20 μs (e.g., shorter than the length of scan steps in the awake state). If touch activity is detected on the touch screen, the electronic device can determine whether the resulting touch data has a sufficiently high signal-to-noise ratio such that the device is able to identify the touch activity, and determine whether it is a predetermined gesture to wake the electronic device. If the electronic device is able to identify the touch activity, then the electronic device can maintain the lengths of scan steps 722, as is. However, if the resulting touch data has an insufficiently high signal-to-noise ratio such that the electronic device is unable to identify the touch activity, the electronic device can gradually or incrementally increase the lengths of scan steps 722 (e.g., from 20 μs to 30 μs, from 30 μs to 40 μs, etc.) until the resulting touch data has a sufficiently high signal-to-noise ratio such that the device is able to identify the touch activity on the touch screen. In some examples, the increased lengths of scan steps 722 can remain less than the lengths of scan steps in the awake state, while in other examples, the increased lengths of scan steps 722 can match or exceed the lengths of scan steps in the awake state. Once the electronic device is able to identify the touch activity on the touch screen, it can take appropriate action (e.g., wake the electronic device, because the touch activity corresponds to the predetermined gesture to wake the electronic device, or maintain the electronic device in the sleep state, because the touch activity does not correspond to the predetermined gesture to wake the electronic device), and in the next touch frame $T_S$ 710 during the sleep state, the electronic device can return to utilizing the scan steps 722 that have the initial, short length, such as 20 μs. The electronic device can, then, repeat the above when subsequent touch activity is detected on the touch screen. In some examples, the above-described signal-to-noise ratio-based scan length adjustments can occur in the first low-power state, the second low-power state, etc., in situations in which the electronic device has an active state and a plurality of low-power states, as previously described.

In some examples, in addition or alternatively to adjusting the lengths of scan steps 722 based on touch activity, as described above, the electronic device can adjust the lengths of scan steps 722 based on the results of SPA 720. For example, in operation, the electronic device can have the ability to sense touch at a given set of touch sensing frequencies (e.g., three, five or ten different touch sensing frequencies from which the electronic device can select). If the scan of the touch screen during SPA 720 indicates that noise at the various touch sensing frequencies of the electronic device is above a noise threshold, the electronic device can increase the lengths of scan steps 722 in order to improve the signal-to-noise ratio of the resulting touch data. In some examples, the electronic device can gradually or incrementally increase the lengths of scan steps 722 (e.g., from 20 μs to 30 μs, from 30 μs to 40 μs, etc.) until the resulting touch data has a sufficiently high signal-to-noise ratio such that the device is able to identify the touch activity on the touch screen. In some examples, the electronic device can directly increase the lengths of scan steps 722 to a specified amount based on the results of SPA 720. For example, if the SPA 720 scan indicates noise of a first amount, the electronic device can increase the lengths of scan steps 722 to a first length, and if the SPA 720 scan indicates noise of a second amount, greater than the first amount, the electronic device can increase the lengths of scan steps 722 to a second length, greater than the first length. In some examples, the increased lengths of scan steps 722 can remain less than the lengths of scan steps in the awake state, while in other examples, the increased lengths of scan steps 722 can match or exceed the lengths of scan steps in the awake state. Once the electronic device is able to identify the touch activity on the touch screen, it can take appropriate action (e.g., wake the electronic device, because the touch activity corresponds to the predetermined gesture to wake the electronic device, or maintain the electronic device in the sleep state, because the touch activity does not correspond to the predetermined gesture to wake the electronic device), and in the next touch frame $T_S$ 710 during the sleep state, the electronic device can return to utilizing the scan steps 722 that have the initial, short length, such as 20 μs. The electronic device can, then, repeat the above when subsequent SPA 720 scans are performed in subsequent touch frames $T_S$ 710 in the sleep state. In some examples, the above-described SPA 720-based scan length adjustments can occur in the first low-power state, the second low-power state, etc., in situations in which the electronic device has an active state and a plurality of low-power states, as previously described.

In some examples, in addition or alternatively to adjusting the lengths of scan steps 722 based on touch activity and/or the results of SPA 720, as described above, the electronic device can adjust the lengths of scan steps 722 based on power considerations. For example, the electronic device can utilize scan steps 722 of the shortest length possible (e.g., to reduce power consumption) while maintaining sufficient touch sensing performance (e.g., maintaining a signal-to-noise ratio that is greater than a threshold ratio, maintaining a touch signal value that is greater than a touch signal value threshold, etc.). It should be noted that the examples of the disclosure have been provided in the context of a touch screen, but it is understood that the examples of the disclosure can similarly be implemented in the context of a touch sensor panel. Further, in some examples, the electronic device can adjust the lengths of scan steps in touch frames 608 in the awake state in manners similar to those described above with reference to touch frames 710 in the sleep state (e.g., based on touch activity, the results of an SPA scan, power considerations, etc.). In some examples, the above-described power-based scan length adjustments can occur in the first low-power state, the second low-power state, etc., in situations in which the electronic device has an active state and a plurality of low-power states, as previously described.

It should be noted that the ranges of possible scan step lengths ("integration times") in the different states (e.g., sleep state, awake state, a first low-power state, a second low-power state, etc.) of the electronic device may or may not be overlapping. In the context of this discussion, a range of scan step lengths for a given operational state of the electronic device can refer to the range from the shortest scan step length in that operational state to the longest scan step length in that operational state. For example, the shortest scan step length in the awake state can be longer than the longest scan step length in the sleep state; in examples in which the electronic device has two or more low-power states (e.g., the "sleep state" corresponds to multiple low-power states), the ranges of scan step lengths in the multiple low-power states can be non-overlapping with the range of scan step lengths in the awake state, though the ranges of scan step lengths in the multiple low-power states can be overlapping with each other (e.g., the shortest scan step length in a first low-power state can be longer than the shortest scan step length in the second low-power state and shorter than the longest scan step length in the second low-power state). In some examples, the range of scan step lengths in the awake state can partially overlap with the range of scan step lengths in the first low-power state, but the range of scan step lengths in the second low-power state may not overlap with the range of scan step lengths in the first low-power state and/or the range of scan step lengths in the awake state—in some examples, the range of scan step lengths in the second low-power state may overlap with the range of scan step lengths in the first low-power state. In some examples, the electronic device can have three or more operational states (e.g., awake state, first low-power state and second low-power state) that have ranges of scan step lengths that do not overlap at all with each other. Other such permutations of ranges of scan step lengths are similarly contemplated.

In some examples, the electronic device can dynamically "gang" and "ungang" drive lines (e.g., drive lines 522 in FIG. 5) and/or sense lines (e.g., sense lines 526 in FIG. 5) during scan steps 722 depending on touch activity detected on the touch screen. In this context, "ganging" two lines together can refer to electrically connecting the two lines together, in parallel, such that the two lines behave, electrically, as one line. "Unganging" two lines can refer to electrically disconnecting the two lines, which were previously electrically connected in parallel, such that the two lines behave, electrically, as two separate lines. The electronic device can perform such dynamic ganging of lines in combination with any of the scan step 722 length-adjustment schemes discussed above. Further exemplary ganging and unganging details will be provided below.

Figure 8A:
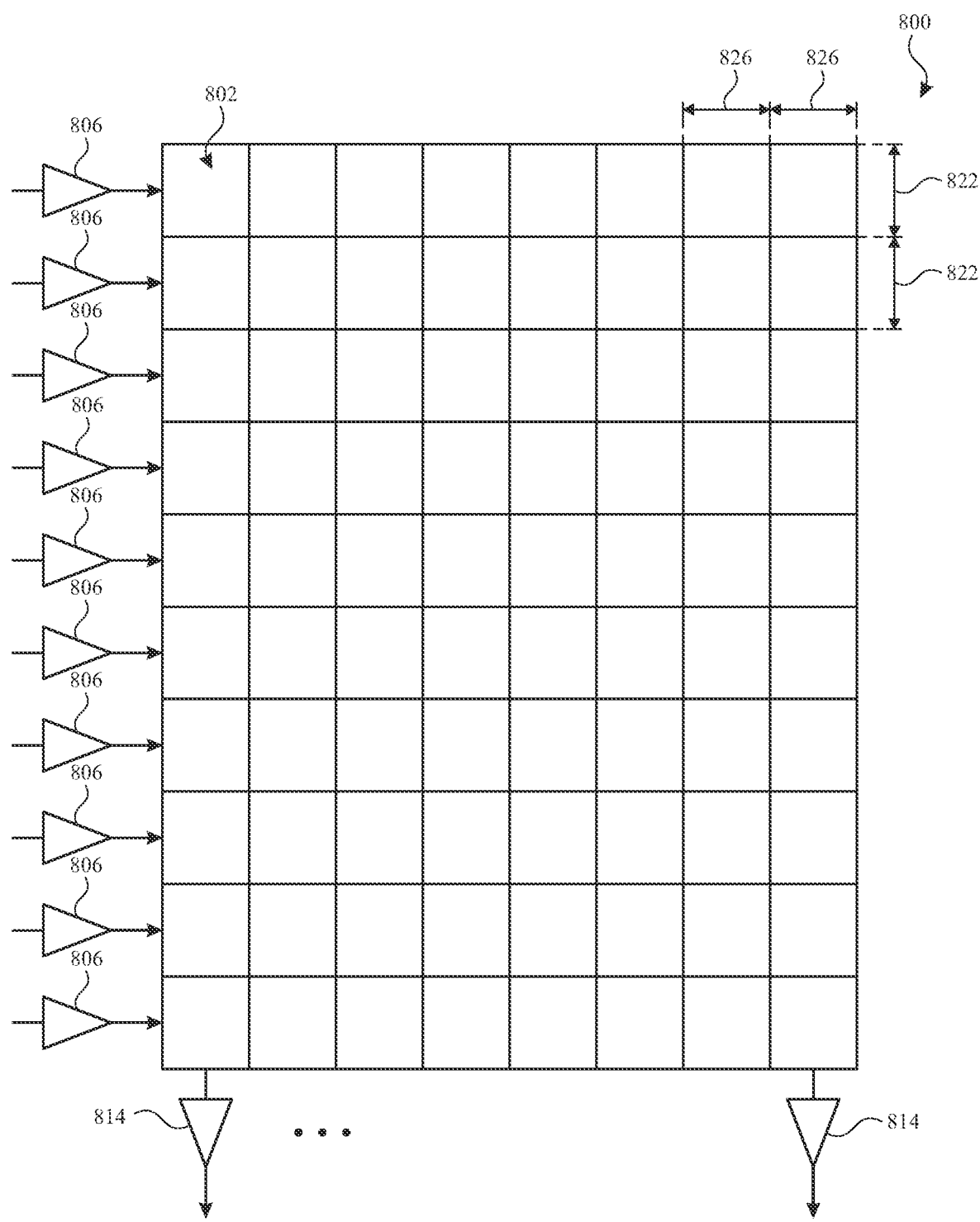
FIGS. 8A-8B illustrate exemplary drive and/or sense line ganging according to examples of the disclosure.
Figure 8B:
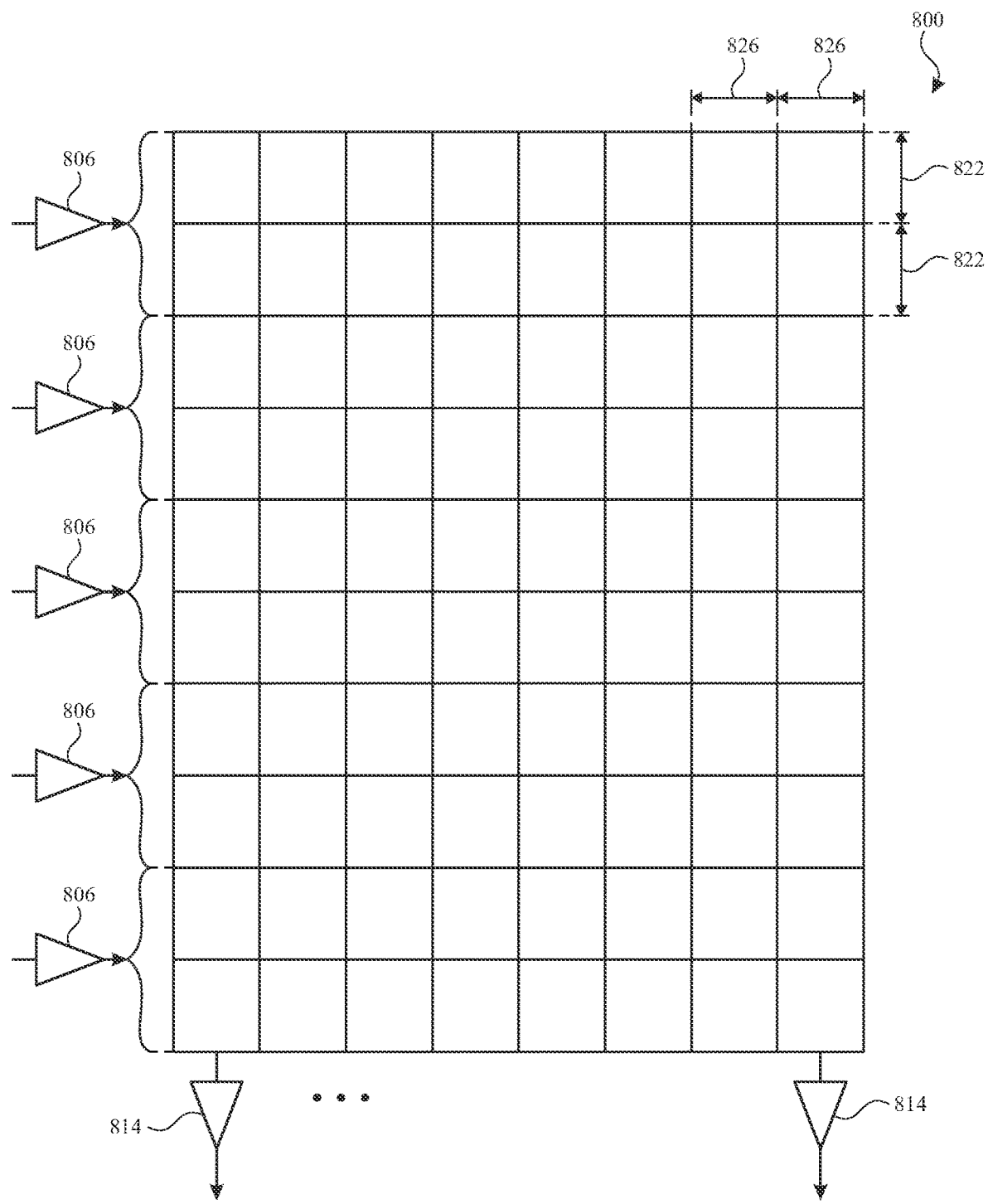

FIGS. 8A-8B illustrate exemplary drive and/or sense line ganging according to examples of the disclosure. Specifically, FIG. 8A illustrates touch screen 800 in which no drive lines 822 or sense lines 826 are ganged together. Each drive circuitry 806 can drive its own drive line 822, and each sense circuitry 814 can sense its own sense line 826. FIG. 8B illustrates touch screen 800 in which drive lines 822 have been ganged together. For example, pairs of drive lines 822 have been electrically connected, in parallel, to the outputs of drive circuitry 806. In this way, a single drive circuitry 806 can drive two drive lines 822 connected in parallel. Though not illustrated, further ganging of drive lines 822 can be performed, such that three or more drive lines 822 are ganged together and driven by a single drive circuitry 806. Additionally, sense lines 826 can similarly be ganged together such that a single sense circuitry 814 can sense multiple sense lines 826. Such ganging of drive lines 822 and/or sense lines 826 can reduce power consumption during the sleep state, because fewer drive circuitry 806 and/or sense circuitry 814 may need to be operating during touch sensing. In some examples, the electronic device may only perform such ganging during the sleep state (e.g., during touch frames $T_S$ 710) and may not perform such ganging during the awake state (e.g., during touch frames $T_A$ 610). It should be noted that the examples of the disclosure have been provided in the context of a touch screen, but it is understood that the examples of the disclosure can similarly be implemented in the context of a touch sensor panel.

Referring back to FIG. 7, as mentioned above, the electronic device can dynamically gang or ungang the drive and/or sense lines in the touch screen during scan steps 722. Specifically, ganging drive and/or sense lines can reduce the spatial touch resolution of the touch data resulting from scan steps 722. Therefore, the electronic device may not be able to determine whether touch activity detected on the touch screen while various drive and/or sense lines are ganged corresponds to a predetermined gesture to wake the electronic device. However, it can be beneficial for the electronic device to utilize ganged drive and/or sense lines as much as possible during the sleep state to reduce power consumption during the sleep state resulting from touch sensing. Therefore, in some examples, the electronic device can initially utilize scan steps 722 in which one or more drive lines or sense lines are ganged together (e.g., as illustrated in FIG. 8B). Using these scan steps 722 with the ganged drive and/or sense lines, the electronic device can sense touch on its touch screen in the sleep state. In some examples, if touch activity is detected on the touch screen with these ganged lines, the electronic device can reduce the ganging of its drive and/or sense lines (e.g., as illustrated in FIG. 8A) in subsequent scan steps 722 and can determine whether the touch activity is a predetermined gesture to wake the electronic device. In some examples, reducing the ganging of the drive and/or sense lines can correspond to moving from a more-ganged configuration (e.g., three drive lines ganged together) to a less-ganged configuration (e.g., two drive lines ganged together), and in some examples, reducing the ganging of the drive and/or sense lines can correspond to moving from a ganged configuration (e.g., three drive lines ganged together) to an unganged configuration (e.g., no drive lines ganged together).

In other examples, before reducing the ganging of its drive and/or sense lines in response to detecting touch activity on the touch screen, the electronic device can first determine whether the touch data resulting from the ganged scan steps 722 has sufficiently high spatial resolution such that the device is able to identify the touch activity, and determine whether it is a predetermined gesture to wake the electronic device. If the electronic device is able to identify the touch activity and determine whether it is a predetermined gesture to wake the electronic device, then the electronic device can maintain the ganging of lines in scan steps 722, as is. However, if the resulting touch data has an insufficient spatial resolution such that the electronic device is unable to identify the touch activity, the electronic device can gradually or incrementally reduce the ganging of its drive and/or sense lines (e.g., from three ganged lines to two ganged lines, and from two ganged lines to one ganged line) until the resulting touch data has a sufficiently high spatial resolution such that the device is able to identify the touch activity on the touch screen and determine whether it is a predetermined gesture to wake the electronic device. Once the electronic device is able to identify the touch activity on the touch screen, it can take appropriate action (e.g., wake the electronic device, because the touch activity corresponds to the predetermined gesture to wake the electronic device, or maintain the electronic device in the sleep state, because the touch activity does not correspond to the predetermined gesture to wake the electronic device), and in the next touch frame $T_S$ 710 during the sleep state, the electronic device can return to utilizing the scan steps 722 in which the initial amount of one or more drive lines or sense lines are ganged together. The electronic device can, then, repeat the above when subsequent touch activity is detected on the touch screen. In some examples, the above-described drive/sense line ganging adjustments can occur in the first low-power state, the second low-power state, etc., in situations in which the electronic device has an active state and a plurality of low-power states, as previously described.

Figure 9:
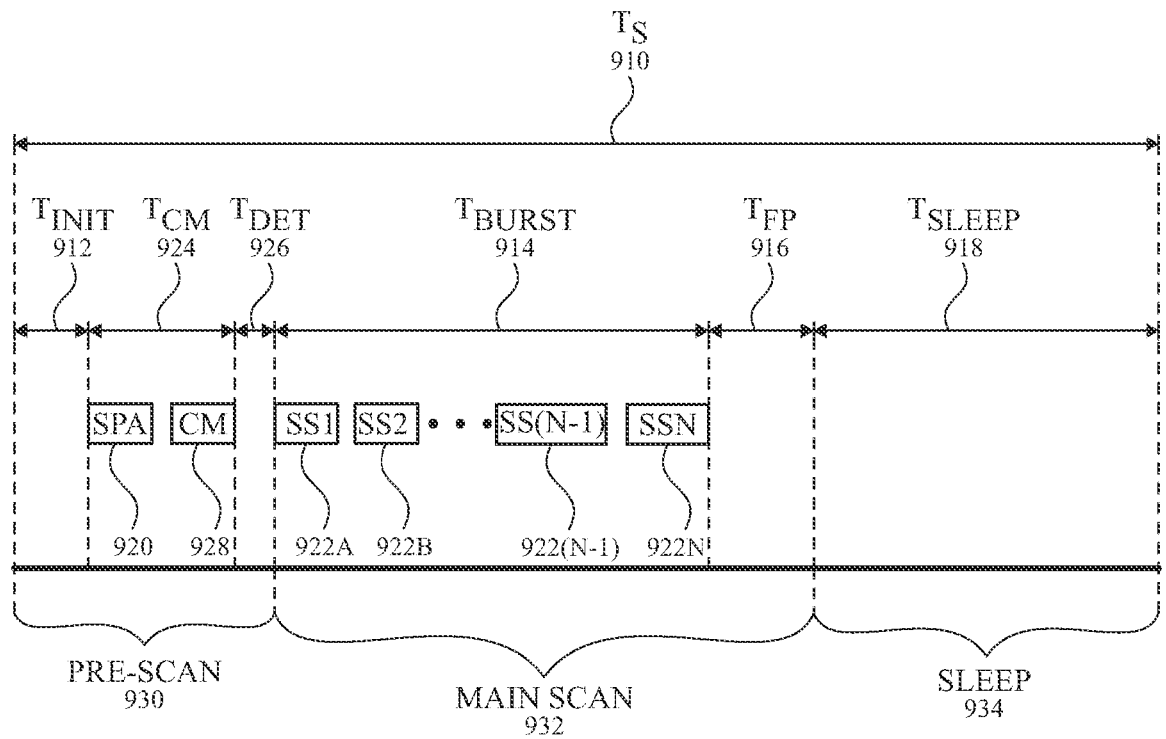
FIG. 9 illustrates an exemplary touch frame of an electronic device in a sleep state that includes conditional performance of touch scan steps according to examples of the disclosure.

In touch frame $T_S$ 710 of FIG. 7, the electronic device can perform scan steps 722 during each touch frame $T_S$ 710 even when there is no touch activity detected on the touch screen of the electronic device. It can be beneficial to only perform scan steps 722 when some touch activity is detected on the touch screen to reduce power consumption during the sleep state. FIG. 9 illustrates an exemplary touch frame $T_S$ 910 of an electronic device in a sleep state (and/or during the first low-power state, the second low-power state, etc., in situations in which the electronic device has an active state and a plurality of low-power states, as previously described) that includes conditional performance of scan steps 922 according to examples of the disclosure. Touch frame $T_S$ 910 can have a similar configuration as touch frame $T_S$ 710, except as otherwise described here. In particular, touch frame $T_S$ 910 can include three portions: a pre-scan portion 930, a main scan portion 932 and a sleep portion 934. During the pre-scan portion 930, the electronic device can determine whether the main scan portion 932 should be performed, as will be described below. If so, the electronic device can perform the main scan portion 932 and then the sleep portion 934. If not, the electronic device can skip the main scan portion 932, and instead, can extend the sleep portion 934 of touch frame $T_S$ 910 to the end of the pre-scan portion 930 of touch frame $T_S$ 910, and the electronic device can perform the sleep portion 934. The sleep portion 934 of touch frame $T_S$ 910 can comprise sleep frame $T_{sleep}$ 918 during which no touch sensing may be performed on the touch screen, the details of which can correspond to sleep frame $T_{sleep}$ 718 in FIG. 7 and will not be repeated here for brevity. Exemplary details of the pre-scan portion 930 and the main scan portion 932 of touch frame $T_S$ 910 will now be described.

As mentioned above, during the pre-scan portion 930, the electronic device can determine whether the main scan portion 932 should be performed; specifically, whether any touch activity is detected on the touch screen. In particular, pre-scan portion 930 can include initialization frame $T_{init}$ 912, during which various touch-related circuitry in the touch screen can be initialized and prepared for touch scanning. For example, a touch processor and/or controller (e.g., 202 and 206 in FIG. 2), drive circuitry (e.g., 306 in FIG. 3B) and/or sense circuitry (e.g., 314 in FIGS. 3A-3B) can be initialized during $T_{init}$ 912. Pre-scan portion 930 can also include common mode scan frame $T_{CM}$ 924. In some examples $T_{CM}$ 924 can follow immediately after $T_{init}$ 912, though other configurations are also possible. During $T_{CM}$ 924, the electronic device can perform SPA scan 920 (e.g., as described with reference to SPA scan 720 in FIG. 7) and CM scan 928. During CM scan 928, the electronic device can concurrently: 1) stimulate all of its drive lines with the same stimulation signal, and 2) sense all of it sense lines. The frequency at which the electronic device stimulates its drive lines during the CM scan 928 can be one of the low noise frequencies detected by the electronic device during SPA scan 920. The purpose of CM scan 928 can be to determine whether any touch activity at all is present on the touch screen, without the need to determine any characteristics about the touch activity. Therefore, during the touch activity determination frame $T_{det}$ 926 that can follow $T_{CM}$ 924, the electronic device can determine if the touch data resulting from CM scan 928 indicates a deviation greater than a threshold amount from baseline touch data, which can correspond to touch data when no touch activity is present on the touch screen. This determination performed during $T_{det}$ 926 can be a simple comparison of raw or minimally processed touch data to baseline touch data. If the touch data resulting from CM scan 928 deviates from the baseline touch data by greater than the threshold amount, the electronic device can perform the main scan portion 932 of touch frame $T_S$ 910 (e.g., because this deviation can indicate that touch activity is likely present on the touch screen). If the touch data resulting from CM scan 928 does not deviate from the baseline touch data by greater than the threshold amount, the electronic device can forgo performing the main scan portion 932, and can instead extend the sleep portion 934 of touch frame $T_S$ 910 to the end of the pre-scan portion 930, and can transition directly to the sleep portion 934.

The main scan portion 932 of touch frame $T_S$ 910 can include touch measurement frame $T_{burst}$ 914 and $T_{fp}$ 916. $T_{burst}$ 914 can be a period during which touch can be sensed on the touch screen, and can include scan steps 922 which can correspond to scan steps 722 in FIG. 7, the details of which will not be repeated here for brevity. Further, $T_{fp}$ 916 can be a period during which the electronic device can process the touch data collected during scan steps 922 to determine whether a particular touch input for waking the electronic device has been detected on the touch screen, and can correspond to $T_{fp}$ 716 in FIG. 7, the details of which will not be repeated here for brevity.

Because touch frame $T_S$ 910 can include pre-scan portion 930, main scan portion 932 and sleep portion 934, as described above, scan steps 922 may not be performed in every touch frame $T_S$ 910, and may only be performed in touch frames $T_S$ 910 in which some touch activity is detected on the touch screen. As a result, the electronic device can consume less power in the sleep state than it may have consumed if it operated according to touch frame $T_S$ 710 in FIG. 7. Further, the electronic device can utilize short scan steps 922, dynamically alter the lengths of scan steps 922, and/or gang drive and/or sense lines during CM scan 928 and/or scan steps 922, as described above, in touch frame $T_S$ 910 to further reduce power consumption during the sleep state of the electronic device.

As mentioned above, the electronic device can utilize baseline touch data in pre-scan portion 930 of touch frame $T_S$ 910 to determine whether any touch activity is likely occurring on the touch screen (e.g., by comparing measured touch data to the baseline touch data), where the baseline touch data can correspond to touch data when there is no touch activity on the touch screen. Similarly, during the main scan 932, when the electronic device is identifying and evaluating the touch activity on the touch screen with greater precision than in the pre-scan portion 930, the electronic device can utilize baseline touch data in order to determine the location(s) and or amount(s) of touch on the touch screen. Therefore, in some examples, the electronic device can have stored in its memory such baseline touch data for use in touch frame $T_S$ 910. In some examples, the electronic device can require such baseline touch data for each type of scan it performs (e.g., baseline touch data for CM scan 928, and baseline touch data for the main scan performed in scan steps 922), and for each frequency it might utilize for each of those types of scans (e.g., each of a predetermined number of frequencies that SPA scan 920 can evaluate to identify a low noise frequency at which to perform CM scan 928 and scan steps 922).

However, the actual touch data measured on the touch screen when there is no touch activity on the touch screen can change over time due to changes in temperature, humidity or other environmental conditions at the electronic device. Therefore, it can be beneficial for the electronic device to periodically update its baseline touch data. However, if the electronic device is operating according to touch frame $T_S$ 910, there may be long periods of time when the main scan portion 932 (e.g. a second scan type) is not triggered, because no touch activity is detected during the pre-scan portion 930 (e.g. a first scan type) of touch frame $T_S$ 910. Therefore, in some examples, the electronic device can periodically intentionally trigger main scan portion 932 (e.g. a second scan type)—despite the electronic device not detecting touch activity in the pre-scan portion 930 (e.g. a first scan type)—during which the electronic device can perform scan steps 922, and can store the touch data resulting from scan steps 922 as updated baseline touch data for use in future scan steps 922. In the touch frames $T_S$ 910 in which the electronic device intentionally triggers main scan portion 932, the electronic device can also store, as baseline touch data, the touch data resulting from CM scan 928 (for use as baseline touch data in future CM scans 928). Further, in some examples, the electronic device may only trigger such a baseline-updating main scan portion 932 if the pre-scan portion 930 indicates no touch activity is present on the touch screen, because the baseline touch data should correspond to no-touch touch data.

Figure 10:
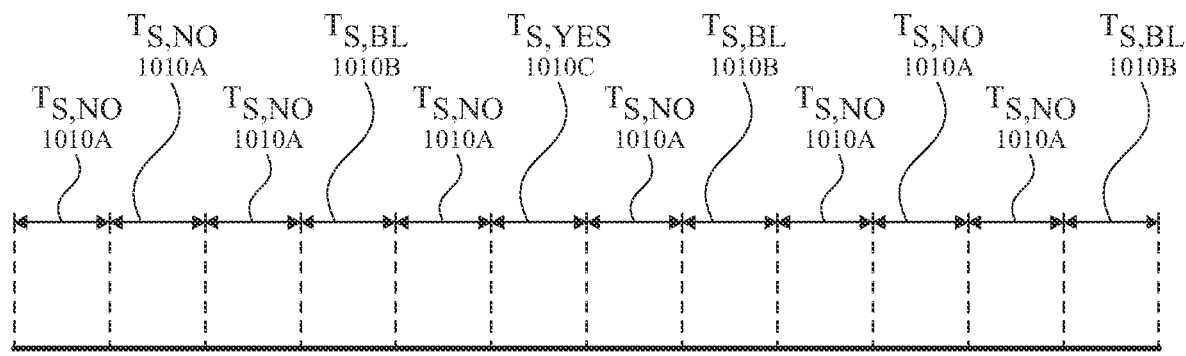
FIG. 10 illustrates an exemplary timeline of touch frames with intentional main scan triggering according to examples of the disclosure.

For example, FIG. 10 illustrates an exemplary timeline of touch frames with intentional main scan triggering according to examples of the disclosure. In the example of FIG. 10, a $T_{S,no}$ 1010A touch frame can correspond to a touch frame in which no touch activity was detected during pre-scan portion 930, and the main scan portion 932 was not triggered. A $T_{S,BL}$ 1010B touch frame can correspond to a touch frame in which no touch activity was detected during pre-scan portion 930, but the main scan portion 932 was triggered by the electronic device in order to gather and update its baseline touch data. Finally, a $T_{S,yes}$ 1010C touch frame can correspond to a touch frame in which touch activity was detected during pre-scan portion 930, and therefore the main scan portion 932 was triggered by the electronic device in order to identify and analyze the touch activity on the touch screen. Further, in the example of FIG. 10, a $T_{S,BL}$ 1010B touch frame can be triggered every three frames.

For example, in the first three touch frames $T_{S,no}$ 1010A illustrated in FIG. 10, no touch activity is detected during the pre-scan portion 930 of the touch frames. Following the first three touch frames $T_{S,no}$ 1010A in FIG. 10, the electronic device intentionally triggers touch frame $T_{S,BL}$ 1010B to update its baseline touch data. In the next touch frame $T_{S,no}$ 1010A, no touch activity is detected during the pre-scan portion 930 of the touch frame. In the next touch frame, touch activity is detected during the pre-scan portion 930 of the touch frame, and therefore touch frame $T_{S,yes}$ 1010C is executed. Following touch frame $T_{S,yes}$ 1010C, no touch is detected during the pre-scan portion 930 of touch frame $T_{S,no}$ 1010A. After touch frame $T_{S,no}$ 1010A, because it has been three touch frames since the baseline touch data was last updated, the electronic device has intentionally triggered touch frame $T_{S,BL}$ 1010B to update its baseline touch data. Such periodic, intentional triggering can continue in future touch frames. It is understood that the example of triggering a touch frame to update baseline touch data every three touch frames is provided as an example, only, and that other frequencies of touch frame triggering can be implemented.

Because each frequency at which touch activity is sensed on the electronic device can require its own baseline touch data (e.g., no-touch touch data collected during the CM scan 928 or scan steps 922 at that frequency) and because collecting baseline touch data for each frequency can require that a distinct baseline-update touch frame be triggered for that frequency, the number of frequencies used for touch sensing during the sleep state can be directly related to the number of baseline-update touch frames that may need to be triggered. However, each triggered baseline-update touch frame can consume more power than a touch frame in which the main scan portion 932 is not triggered. Therefore, it can be beneficial to reduce the number of intentionally triggered baseline-update touch frames during the sleep state (and/or during the first low-power state, the second low-power state, etc., in situations in which the electronic device has an active state and a plurality of low-power states, as previously described). To this end, in some examples, the electronic device can utilize fewer frequencies for sensing touch on the touch screen during the sleep state (and/or during the first low-power state, the second low-power state, etc., in situations in which the electronic device has an active state and a plurality of low-power states, as previously described) than during the awake state (e.g., the SPA scan 920 can scan those fewer frequencies to identify one or more low noise frequencies, and one of those low noise frequencies can be used during CM scan 928 and scan steps 922). Thus, in some examples, the electronic device can, during the sleep state, select from a first set of candidate touch sensing frequencies for use in touch sensing, and during the awake state, select from a second set of candidate touch sensing frequencies for use in touch sensing, where the first set of candidate touch sensing frequencies includes fewer candidate frequencies than the second set of candidate touch sensing frequencies. In some examples, over a given period of time (e.g., over a certain number of scan steps, touch frames, sleep-to-awake transitions, etc.), the electronic device will have scanned for touch using fewer touch sensing frequencies in the sleep state (e.g., using all of the candidate touch sensing frequencies for the sleep state) than it will have used in the awake state (e.g., using all of the candidate touch sensing frequencies for the awake state, which can be more than in the sleep state). Utilizing fewer touch sensing frequencies during the sleep state can provide satisfactory touch sensing performance, because during the sleep state (e.g., when many of the subsystems of the electronic device, such as the display, processors, etc. can be in a low-power or off state), fewer sources of noise, and thus fewer noise frequencies, may be present than in the awake state. As a result of utilizing fewer touch sensing frequencies during the sleep state, fewer sets of baseline touch data may need to be tracked by the electronic device, and fewer baseline-update touch frames may need to be triggered during the sleep state. In some examples, these fewer frequencies can be a subset of the frequencies used to sense touch at the touch screen during the awake state, while in other examples, these fewer frequencies can include frequencies both used and not used in the awake state and/or can include only frequencies not used in the awake state (e.g., can include frequencies that are different than any frequency used in the awake state).

Further, in addition or alternatively to the above, because during the sleep state the electronic device may only be trying to identify a particular touch input (e.g., a tap), and may not require the touch detection precision of the awake state, in some examples, the electronic device can update its baseline touch data less frequently during the sleep state than in the awake state. For example, in the awake state, the electronic device may trigger a baseline-update touch frame to update its baseline touch data once every five minutes, whereas in the sleep state, the electronic device may trigger a baseline-update touch frame to update its baseline touch data once every hour. In other words, the electronic device can determine whether it has been longer than a threshold amount of time or frames since the last time the baseline touch data was updated, where the threshold amount of time or frames in the sleep state can be longer than the threshold amount of time or frames in the awake state; if more time than the threshold amount of time has passed since the last update of the baseline touch data, the electronic device can update the baseline touch data. As such, power consumption during the sleep state can be further reduced. In some examples, the above-described baseline touch data tracking adjustments can occur in the first low-power state, the second low-power state, etc., in situations in which the electronic device has an active state and a plurality of low-power states, as previously described. For example, the electronic device can utilize a first number of frequencies for touch sensing during the first low-power state, and can update its baseline touch data for those frequencies at a first rate, and can utilize a second number (e.g., less than the first number) of frequencies for touch sensing during the second low-power state, and can update its baseline touch data for those frequencies at a second rate (e.g., less than the first rate). In some examples, the number of frequencies utilized for touch sensing and/or the rate at which the baseline touch data for those frequencies is updated during the first and second low-power states can be less than the number of frequencies utilized for touch sensing and/or the rate at which the baseline touch data for those frequencies is updated during the active state.

Figure 11:
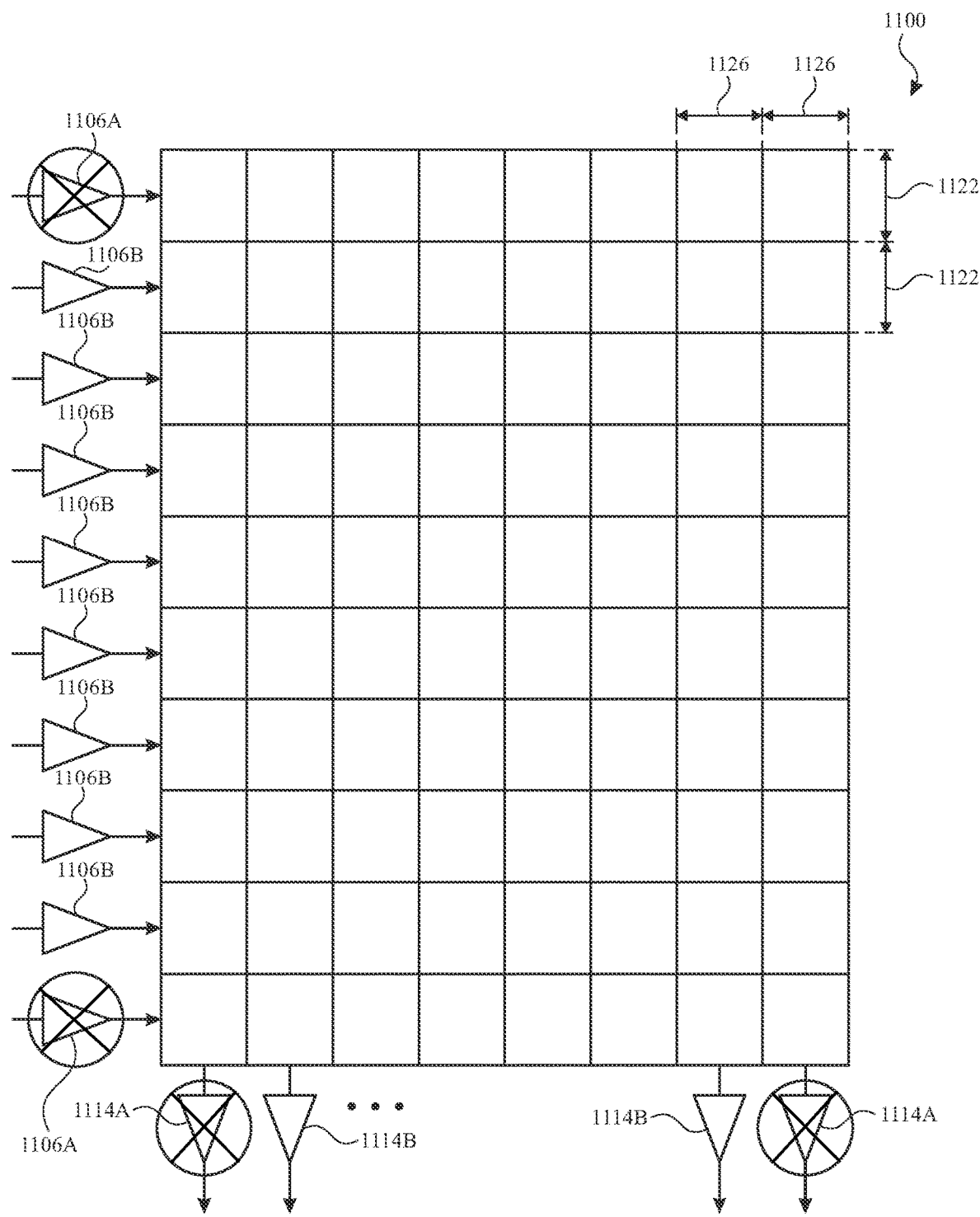
FIG. 11 illustrates an exemplary touch screen in which the drive circuitry and/or sense circuitry corresponding to edge regions of the touch screen have been powered down according to examples of the disclosure.

Referring back to FIG. 9, in some examples, the electronic device may require that the touch input for waking the electronic device from the sleep state be detected in a specific portion of the touch screen. For example, the electronic device may only accept device-waking input that is detected in the center region of the touch screen, and not around the edges of the touch screen (e.g., to prevent fingers positioned around the edges of the device while a user is holding device from waking the device unintentionally). Therefore, in some examples, during CM scan 928 in touch frame $T_S$ 910, the electronic device can ignore touch data received by sense circuitry that sense touch within edge regions of a predetermined size of the touch screen (e.g., the left-most and right-most sense circuitry 514 in FIG. 5, or some other determined number of sense circuitry 514 corresponding to the left and right sides of touch screen 500). Further, in some examples, rather than simply ignoring edge touch data, the electronic device can power-down drive circuitry and/or sense circuitry corresponding to the edge regions of the touch screen during CM scan 928. FIG. 11 illustrates an exemplary touch screen 1100 in which the drive circuitry 1106 and/or sense circuitry 1114 corresponding to edge regions of the touch screen 1100 have been powered down according to examples of the disclosure. Specifically, in some examples, the electronic device can power-down drive circuitry 1106A corresponding to the top and bottom edges of touch screen 1100 during CM scan 928, such that those drive circuitry 1106A do not stimulate their respective drive lines 1122 during CM scan 928. Drive circuitry 1106B corresponding to the center region of touch screen 1100 can be powered-up and operate as usual (e.g., as described in this disclosure). Similarly, additionally or alternatively to powering-down drive circuitry 1106A, the electronic device can power-down sense circuitry 1114A corresponding to the left and right edges of touch screen 1100 during CM scan 928, such that those sense circuitry 1114A do not sense touch on their respective sense lines 1126 during CM scan 928. Sense circuitry 1114B corresponding to the center region of touch screen 1100 can be powered up and operate as usual (e.g., as described in this disclosure). In this way, touch activity at the edges of touch screen 1100 can be prevented from triggering main scan 932 and/or causing the electronic device to transition from the sleep state to the awake state. In some examples, the above-described drive/sense circuitry deactivation can occur in the first low-power state, the second low-power state, etc., in situations in which the electronic device has an active state and a plurality of low-power states, as previously described.

Any of the sleep state touch sensing schemes described in this disclosure can be used in combination with one another. Further, which of those schemes are used together and/or the parameters of the scheme(s) used can be based on which components of the electronic device are powered up or operating during the sleep state (e.g., which sub-state of a second low-power state the electronic device is in, in situations in which the electronic device has an active state and a plurality of low-power states, as previously described). For example, if the electronic device is playing music through a speaker during the sleep state, the speaker driver and/or other circuitry associated with the speaker can be a source of noise for touch sensing on the touch screen of the electronic device. Therefore, in circumstances where the electronic device is playing audio through its speaker during the sleep state, the electronic device can utilize main scan steps (e.g., scan steps 722 in FIG. 7 and/or scan steps 922 in FIG. 9) with greater length to improve the signal-to-noise ratio of the resulting touch signals, and in circumstances where the electronic device is not playing audio through its speaker during the sleep state, the electronic device can utilize main scan steps (e.g., scan steps 722 in FIG. 7 and/or scan steps 922 in FIG. 9) with shorter length to reduce the power consumed by those main scan steps. Other implementations in which parameters of touch sensing during the sleep state are adjusted based on which components of the electronic device (e.g., radio circuitry, such as Wi-Fi or cellular circuitry) are powered on or operating during the sleep state, or which state or sub-state the electronic device is operating in, are similarly contemplated. For example, a given parameter of touch sensing (e.g., such as those described above, like scan step length, electrode ganging, drive/sense circuitry deactivation, etc.) can be changed as the electronic device transitions from one state (e.g., an active state) to another state (e.g., a first low-power state, a second low-power state, etc.).

Thus, the examples of the disclosure provide various ways for sensing touch during a sleep state of an electronic device while maintaining low power consumption during the sleep state. Sensing touch during the sleep state can be used to detect, on a touch screen or touch sensor panel of the electronic device, a touch input for transitioning the electronic device from the sleep state to an awake state.

Therefore, according to the above, some examples of the disclosure are directed to a touch controller comprising: sense circuitry configured to sense touch at one or more touch electrodes on a touch sensor panel; and a touch processor configured to: while an electronic device is in a first state during which a first component of the electronic device is in a first power state, cause the sense circuitry to sense touch at the one or more touch electrodes using one or more first touch scan steps having a first length; and while the electronic device is in a second state, different from the first state, during which the first component of the electronic device is in a second power state, different from the first power state, cause the sense circuitry to sense touch at the one or more touch electrodes, for transitioning the electronic device from the second state to the first state, using one or more second touch scan steps having a second length, shorter than the first length. Additionally or alternatively to one or more of the examples disclosed above, in some examples the first state comprises an awake state of the electronic device, and the second state comprises a sleep state of the electronic device. Additionally or alternatively to one or more of the examples disclosed above, in some examples the touch processor is further configured to, while the electronic device is in the second state: in response to causing the sense circuitry to sense touch at the one or more touch electrodes using the one or more second touch scan steps: in accordance with a determination that the sense circuitry senses touch activity at the one or more touch electrodes: lengthen the one or more second touch scan steps; and determine whether the touch activity corresponds to a touch input for transitioning the electronic device from the second state to the first state based on the lengthened one or more second touch scan steps; and in accordance with a determination that the sense circuitry does not sense touch activity at the one or more touch electrodes, maintaining the second length of the one or more second touch scan steps. Additionally or alternatively to one or more of the examples disclosed above, in some examples lengthening the one or more second touch scan steps comprises incrementally lengthening the one or more second touch scan steps until the touch processor is able to identify the touch activity at the one or more touch electrodes. Additionally or alternatively to one or more of the examples disclosed above, in some examples the touch processor is further configured to, while the electronic device is in the second state: in accordance with the determination that the sense circuitry senses touch activity at the one or more touch electrodes, reduce an amount of ganging of the one or more touch electrodes. Additionally or alternatively to one or more of the examples disclosed above, in some examples the touch processor is further configured to, while the electronic device is in the second state: determine an amount of touch sensing noise at the touch sensor panel; in accordance with a determination that the amount of touch sensing noise is greater than a noise threshold: lengthen the one or more second touch scan steps; and determine whether the touch activity corresponds to a touch input for transitioning the electronic device from the second state to the first state based on the lengthened one or more second touch scan steps; and in accordance with a determination that the amount of touch sensing noise is less than the noise threshold: maintain the second length of the one or more second touch scan steps; and determine whether the touch activity corresponds to a touch input for transitioning the electronic device from the second state to the first state based on the maintained one or more second touch scan steps. Additionally or alternatively to one or more of the examples disclosed above, in some examples lengthening the one or more second touch scan steps comprises incrementally lengthening the one or more second touch scan steps until the touch processor is able to identify the touch activity at the one or more touch electrodes. Additionally or alternatively to one or more of the examples disclosed above, in some examples the touch controller is integrated within an electronic device that comprises a touch screen, the touch screen including the touch sensor panel. Additionally or alternatively to one or more of the examples disclosed above, in some examples the first component of the electronic device is a display of the electronic device, the first power state of the display is a high power state of the display, and the second power state of the display is a low power state of the display.

Some examples of the disclosure are directed to a touch controller comprising: sense circuitry configured to sense touch at one or more touch electrodes on a touch sensor panel; and a touch processor configured to: while an electronic device is in a first state during which a first component of the electronic device is in a first power state, cause the sense circuitry to sense touch at the one or more touch electrodes using a first touch sensing frequency selected from a first number of candidate touch sensing frequencies; and while the electronic device is in a second state, different from the first state, during which the first component of the electronic device is in a second power state, different from the first power state, cause the sense circuitry to sense touch at the one or more touch electrodes, for transitioning the electronic device from the second state to the first state, using a second touch sensing frequency selected from a second number of candidate touch sensing frequencies, less than the first number of candidate touch sensing frequencies. Additionally or alternatively to one or more of the examples disclosed above, in some examples the first state comprises an awake state of the electronic device, and the second state comprises a sleep state of the electronic device. Additionally or alternatively to one or more of the examples disclosed above, in some examples the touch processor is further configured to: while the electronic device is in the first state, store baseline touch data for each of the first number of candidate touch sensing frequencies at a first periodicity; and while the electronic device is in the second state, store baseline touch data for each of the second number of candidate touch sensing frequencies at a second periodicity, less than the first periodicity. Additionally or alternatively to one or more of the examples disclosed above, in some examples the baseline touch data for each of the first number of candidate touch sensing frequencies and the baseline touch data for each of the second number of candidate touch sensing frequencies corresponds to touch data indicative of no touch activity. Additionally or alternatively to one or more of the examples disclosed above, in some examples the second number of candidate touch sensing frequencies is a subset of the first number of candidate touch sensing frequencies. Additionally or alternatively to one or more of the examples disclosed above, in some examples the touch controller is integrated within an electronic device that comprises a touch screen, the touch screen including the touch sensor panel. Additionally or alternatively to one or more of the examples disclosed above, in some examples the first component of the electronic device is a display of the electronic device, the first power state of the display is a high power state of the display, and the second power state of the display is a low power state of the display.

Some examples of the disclosure are directed to a touch controller comprising: sense circuitry configured to sense touch at one or more touch electrodes on a touch sensor panel; and a touch processor configured to, while an electronic device is in a first state during which the sense circuitry senses touch at the one or more touch electrodes for transitioning the electronic device from the first state to a second state, wherein in the first state a first component of the electronic device is in a first power state, and in the second state the first component of the electronic device is in a second power state, different from the first power state: periodically cause the sense circuitry to perform a scan of a first scan type of the touch sensor panel; in response to determining that a respective scan of the first scan type of the touch sensor panel is indicative of touch activity on the touch sensor panel, cause the sense circuitry to perform a scan of a second scan type, different than the first scan type, of the touch sensor panel to determine whether the touch activity corresponds to a touch input for transitioning the electronic device from the first state to the second state; and in response to determining that the respective scan of the first scan type of the touch sensor panel is not indicative of touch activity on the touch sensor panel: in accordance with a determination that a first condition is satisfied, forgo causing the sense circuitry to perform the scan of the second scan type of the touch sensor panel; and in accordance with a determination that the first condition is not satisfied, cause the sense circuitry to perform the scan of the second scan type of the touch sensor panel to update baseline touch data based on the scan of the second scan type of the touch sensor panel. Additionally or alternatively to one or more of the examples disclosed above, in some examples the first state comprises an awake state of the electronic device, and the second state comprises a sleep state of the electronic device. Additionally or alternatively to one or more of the examples disclosed above, in some examples performing the scan of the first scan type of the touch sensor panel comprises performing a single scan of the touch sensor panel; and performing the scan of the second scan type of the touch sensor panel comprises performing a plurality of scans of the touch sensor panel. Additionally or alternatively to one or more of the examples disclosed above, in some examples the first condition is not satisfied when a time since a last update of the baseline touch data is greater than a threshold amount. Additionally or alternatively to one or more of the examples disclosed above, in some examples the touch processor is further configured to: during the scan of the first scan type of the touch sensor panel, disregard touch input sensed by sense circuitry corresponding to one or more touch electrodes at one or more edges of the touch sensor panel. Additionally or alternatively to one or more of the examples disclosed above, in some examples the touch processor is further configured to: during the scan of the first scan type of the touch sensor panel, power down the sense circuitry corresponding to the one or more touch electrodes at the one or more edges of the touch sensor panel. Additionally or alternatively to one or more of the examples disclosed above, in some examples the touch processor is further configured to: during the scan of the first scan type of the touch sensor panel, power down drive circuitry corresponding to one or more touch electrodes at one or more edges of the touch sensor panel. Additionally or alternatively to one or more of the examples disclosed above, in some examples the touch controller is integrated within an electronic device that comprises a touch screen, the touch screen including the touch sensor panel. Additionally or alternatively to one or more of the examples disclosed above, in some examples the first component of the electronic device is a display of the electronic device, the first power state of the display is a high power state of the display, and the second power state of the display is a low power state of the display. Additionally or alternatively to one or more of the examples disclosed above, in some examples the touch processor is further configured to: in response to determining that the touch activity corresponds to the touch input for transitioning the electronic device from the first state to the second state, transitioning the electronic device from the first state to the second state.

Some examples of the disclosure are directed to a method for sensing touch on a touch sensor panel, the method comprising: while an electronic device is in a first state during which a first component of the electronic device is in a first power state, sensing touch at one or more touch electrodes on the touch sensor panel using one or more first touch scan steps having a first length; and while the electronic device is in a second state, different from the first state, during which the first component of the electronic device is in a second power state, different from the first power state, sensing touch at the one or more touch electrodes, for transitioning the electronic device from the second state to the first state, using one or more second touch scan steps having a second length, shorter than the first length. Additionally or alternatively to one or more of the examples disclosed above, in some examples the first state comprises an awake state of the electronic device, and the second state comprises a sleep state of the electronic device. Additionally or alternatively to one or more of the examples disclosed above, in some examples the method further comprises, while the electronic device is in the second state: in response to sensing touch at the one or more touch electrodes using the one or more second touch scan steps: in accordance with a determination that the sensing senses touch activity at the one or more touch electrodes: lengthening the one or more second touch scan steps; and determining whether the touch activity corresponds to a touch input for transitioning the electronic device from the second state to the first state based on the lengthened one or more second touch scan steps; and in accordance with a determination that the sensing does not sense touch activity at the one or more touch electrodes, maintaining the second length of the one or more second touch scan steps. Additionally or alternatively to one or more of the examples disclosed above, in some examples lengthening the one or more second touch scan steps comprises incrementally lengthening the one or more second touch scan steps until the touch activity at the one or more touch electrodes is able to be identified. Additionally or alternatively to one or more of the examples disclosed above, in some examples the method further comprises, while the electronic device is in the second state: in accordance with the determination that the sense circuitry senses touch activity at the one or more touch electrodes, reduce an amount of ganging of the one or more touch electrodes. Additionally or alternatively to one or more of the examples disclosed above, in some examples the method further comprises, while the electronic device is in the second state: determining an amount of touch sensing noise at the touch sensor panel; in accordance with a determination that the amount of touch sensing noise is greater than a noise threshold: lengthening the one or more second touch scan steps; and determining whether the touch activity corresponds to a touch input for transitioning the electronic device from the second state to the first state based on the lengthened one or more second touch scan steps; and in accordance with a determination that the amount of touch sensing noise is less than the noise threshold: maintaining the second length of the one or more second touch scan steps; and determining whether the touch activity corresponds to a touch input for transitioning the electronic device from the second state to the first state based on the maintained one or more second touch scan steps. Additionally or alternatively to one or more of the examples disclosed above, in some examples lengthening the one or more second touch scan steps comprises incrementally lengthening the one or more second touch scan steps until the touch activity at the one or more touch electrodes is able to be identified. Additionally or alternatively to one or more of the examples disclosed above, in some examples the electronic device comprises a touch screen, the touch screen including the touch sensor panel. Additionally or alternatively to one or more of the examples disclosed above, in some examples the first component of the electronic device is a display of the electronic device, the first power state of the display is a high power state of the display, and the second power state of the display is a low power state of the display.

Some examples of the disclosure are directed to a method for sensing touch on a touch sensor panel, the method comprising: while an electronic device is in a first state during which a first component of the electronic device is in a first power state, sensing touch at one or more touch electrodes on the touch sensor panel using a first touch sensing frequency selected from a first number of candidate touch sensing frequencies; and while the electronic device is in a second state, different from the first state, during which the first component of the electronic device is in a second power state, different from the first power state, cause the sense circuitry to sense touch at the one or more touch electrodes, for transitioning the electronic device from the second state to the first state, using a second touch sensing frequency selected from a second number of candidate touch sensing frequencies, less than the first number of candidate touch sensing frequencies. Additionally or alternatively to one or more of the examples disclosed above, in some examples the first state comprises an awake state of the electronic device, and the second state comprises a sleep state of the electronic device. Additionally or alternatively to one or more of the examples disclosed above, in some examples the method further comprises: while the electronic device is in the first state, storing baseline touch data for each of the first number of candidate touch sensing frequencies at a first periodicity; and while the electronic device is in the second state, storing baseline touch data for each of the second number of candidate touch sensing frequencies at a second periodicity, less than the first periodicity. Additionally or alternatively to one or more of the examples disclosed above, in some examples the baseline touch data for each of the first number of candidate touch sensing frequencies and the baseline touch data for each of the second number of candidate touch sensing frequencies corresponds to touch data indicative of no touch activity. Additionally or alternatively to one or more of the examples disclosed above, in some examples the second number of candidate touch sensing frequencies is a subset of the first number of candidate touch sensing frequencies. Additionally or alternatively to one or more of the examples disclosed above, in some examples the electronic device comprises a touch screen, the touch screen including the touch sensor panel. Additionally or alternatively to one or more of the examples disclosed above, in some examples the first component of the electronic device is a display of the electronic device, the first power state of the display is a high power state of the display, and the second power state of the display is a low power state of the display.

Some examples of the disclosure are directed to a method for sensing touch on a touch sensor panel, the method comprising: while an electronic device is in a first state during which touch is sensed at one or more touch electrodes for transitioning the electronic device from the first state to a second state, wherein in the first state a first component of the electronic device is in a first power state, and in the second state the first component of the electronic device is in a second power state, different from the first power state: periodically performing scan of a first scan type of the touch sensor panel; in response to determining that a respective scan of the first scan type of the touch sensor panel is indicative of touch activity on the touch sensor panel, performing a scan of a second scan type, different than the first scan type, of the touch sensor panel to determine whether the touch activity corresponds to a touch input for transitioning the electronic device from the first state to the second state; and in response to determining that the respective scan of the first scan type of the touch sensor panel is not indicative of touch activity on the touch sensor panel: in accordance with a determination that a first condition is satisfied, forgoing performing the scan of the second scan type of the touch sensor panel; and in accordance with a determination that the first condition is not satisfied, performing the scan of the second scan type of the touch sensor panel to update baseline touch data based on the scan of the second scan type of the touch sensor panel. Additionally or alternatively to one or more of the examples disclosed above, in some examples the first state comprises an awake state of the electronic device, and the second state comprises a sleep state of the electronic device. Additionally or alternatively to one or more of the examples disclosed above, in some examples performing the scan of the first scan type of the touch sensor panel comprises performing a single scan of the touch sensor panel; and performing the scan of the second scan type of the touch sensor panel comprises performing a plurality of scans of the touch sensor panel. Additionally or alternatively to one or more of the examples disclosed above, in some examples the first condition is not satisfied when a time since a last update of the baseline touch data is greater than a threshold amount. Additionally or alternatively to one or more of the examples disclosed above, in some examples the method further comprises: during the scan of the first scan type of the touch sensor panel, disregarding touch input sensed by sense circuitry corresponding to one or more touch electrodes at one or more edges of the touch sensor panel. Additionally or alternatively to one or more of the examples disclosed above, in some examples the method further comprises: during the scan of the first scan type of the touch sensor panel, powering down the sense circuitry corresponding to the one or more touch electrodes at the one or more edges of the touch sensor panel. Additionally or alternatively to one or more of the examples disclosed above, in some examples the method further comprises: during the scan of the first scan type of the touch sensor panel, powering down drive circuitry corresponding to one or more touch electrodes at one or more edges of the touch sensor panel.

Additionally or alternatively to one or more of the examples disclosed above, in some examples the electronic device comprises a touch screen, the touch screen including the touch sensor panel. Additionally or alternatively to one or more of the examples disclosed above, in some examples the first component of the electronic device is a display of the electronic device, the first power state of the display is a high power state of the display, and the second power state of the display is a low power state of the display. Additionally or alternatively to one or more of the examples disclosed above, in some examples the method further comprises: in response to determining that the touch activity corresponds to the touch input for transitioning the electronic device from the first state to the second state, transitioning the electronic device from the first state to the second state.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch controller comprising:
  sense circuitry configured to sense touch activity at one or more touch electrodes on a touch sensor panel; and
  a touch processor configured to:
    while an electronic device is in a first state during which a first component of the electronic device is in a first power state, cause the sense circuitry to sense touch activity at the one or more touch electrodes using a first set of frequencies; and
    while the electronic device is in a second state, different from the first state, during which the first component of the electronic device is in a second power state, different from the first power state:
      cause the sense circuitry to scan the one or more touch electrodes at a second set of frequencies, different from the first set of frequencies, wherein the second set of frequencies contains fewer frequencies than the first set of frequencies;
      identify first one or more frequencies of the second set of frequencies as first low-noise frequencies based on the scan of the one or more touch electrodes at the second set of frequencies; and
      cause the sense circuitry to sense touch activity at the one or more touch electrodes, for transitioning the electronic device from the second state to the first state, using the identified first low-noise frequencies.

2. The touch controller of claim 1, wherein the touch processor is further configured to:
  while the electronic device is in the first state:
    cause the sense circuitry to scan the one or more touch electrodes at the first set of frequencies;
    identify second one or more frequencies of the first set of frequencies as second low-noise frequencies based on the scan of the one or more touch electrodes at the first set of frequencies; and
    cause the sense circuitry to sense touch activity at the one or more touch electrodes using the identified second low-noise frequencies.

3. The touch controller of claim 2, wherein the identified second low noise frequencies are different than the identified first low noise frequencies.

4. The touch controller of claim 1, wherein the second set of frequencies is a subset of the first set of frequencies.

5. The touch controller of claim 1, wherein:
  sensing touch activity at the one or more touch electrodes using the identified first low-noise frequencies is performed using one or more first touch scan steps having a first length; and
  wherein the touch processor is further configured to:
    in accordance with a determination that a noise level at the identified first low-noise frequencies is above a noise threshold, increase a length of the one or more first touch scan steps from the first length to a second length; and
    in accordance with a determination that the noise level at the identified first low-noise frequencies is below the noise threshold, forgo increasing the length of the one or more first touch scan steps.

6. The touch controller of claim 5, wherein:
  sensing touch activity at the one or more touch electrodes using the first set of frequencies is performed using one or more second touch scan steps having a third length; and
  the first length is shorter than the third length.

7. The touch controller of claim 5, wherein:
  sensing touch activity at the one or more touch electrodes using the first set of frequencies is performed using one or more second touch scan steps having a third length; and
  the first length is longer than the third length.

8. The touch controller of claim 1, wherein the touch processor is further configured to:
  while the electronic device is in the first state:
    initiate a process for updating baseline touch data for the touch controller at each frequency of the first set of frequencies; and
  while the electronic device is in the second state:
    initiate a process for updating baseline touch data for the touch controller at each frequency of the second set of frequencies; and
  wherein the baseline touch data corresponds to touch data indicative of no touch activity at the one or more touch electrodes.

9. The touch controller of claim 1, wherein the touch processor is further configured to:
  while the electronic device is in the second state, initiate a process for updating baseline touch data for the touch controller at each frequency of the identified first low-noise frequencies.

10. A method for sensing touch on a touch sensor panel, the method comprising:
  while an electronic device is in a first state during which a first component of the electronic device is in a first power state, sensing touch activity at one or more touch electrodes using a first set of frequencies; and
  while the electronic device is in a second state, different from the first state, during which the first component of the electronic device is in a second power state, different from the first power state:
    scanning the one or more touch electrodes at a second set of frequencies, different from the first set of frequencies, the second set of frequencies containing fewer frequencies than the first set of frequencies;
    identifying first one or more frequencies of the second set of frequencies as first low-noise frequencies based on the scan of the one or more touch electrodes at the second set of frequencies; and
    sensing touch activity at the one or more touch electrodes, for transitioning the electronic device from the second state to the first state, using the identified first low-noise frequencies.

11. The method of claim 10, further comprising:
while the electronic device is in the first state:
scanning the one or more touch electrodes at the first set of frequencies;
identifying second one or more frequencies of the first set of frequencies as second low-noise frequencies based on the scan of the one or more touch electrodes at the first set of frequencies; and
sensing touch activity at the one or more touch electrodes using the identified second low-noise frequencies.

12. The method of claim 11, wherein the identified second low noise frequencies are different than the identified first low noise frequencies.

13. The method of claim 10, wherein the second set of frequencies is a subset of the first set of frequencies.

14. The method of claim 10, wherein:
sensing touch activity at the one or more touch electrodes using the identified first low-noise frequencies is performed using one or more first touch scan steps having a first length; and
wherein the method further comprises:
in accordance with a determination that a noise level at the identified first low-noise frequencies is above a noise threshold, increasing a length of the one or more first touch scan steps from the first length to a second length; and
in accordance with a determination that the noise level at the identified first low-noise frequencies is below the noise threshold, forgoing increasing the length of the one or more first touch scan steps.

15. The method of claim 14, wherein:
sensing touch activity at the one or more touch electrodes using the first set of frequencies is performed using one or more second touch scan steps having a third length; and
the first length is shorter than the third length.

16. The method of claim 14, wherein:
sensing touch activity at the one or more touch electrodes using the first set of frequencies is performed using one or more second touch scan steps having a third length; and
the first length is longer than the third length.

17. The method of claim 10, further comprising:
while the electronic device is in the first state:
initiating a process for updating baseline touch data at each frequency of the first set of frequencies; and
while the electronic device is in the second state:
initiating a process for updating baseline touch data at each frequency of the second set of frequencies; and
wherein the baseline touch data corresponds to touch data indicative of no touch activity at the one or more touch electrodes.

18. The method of claim 10, further comprising:
while the electronic device is in the second state, initiating a process for updating baseline touch data at each frequency of the identified first low-noise frequencies.

19. The touch controller of claim 8, wherein:
the process for updating baseline touch data for the touch controller at each frequency of the first set of frequencies requires a first amount of power proportional to a first number of frequencies in the first set of frequencies;
the process for updating baseline touch data for the touch controller at each frequency of the second set of frequencies requires a second amount of power proportional to a second number of frequencies in the second set of frequencies; and
the first amount of power is greater than the second amount of power.

20. The touch controller of claim 8, wherein:
the process for updating baseline touch data for the touch controller at each frequency of the first set of frequencies occurs at a first rate;
the process for updating baseline touch data for the touch controller at each frequency of the second set of frequencies occurs at a second rate; and
the first rate is greater than the second rate.

21. The touch controller of claim 1, wherein:
the second set of frequencies contains particular frequencies that are different from any frequency in the first set of frequencies.

22. The touch controller of claim 1, wherein:
the second set of frequencies is completely different than the first set of frequencies, and does not contain any frequencies from the first set of frequencies.

23. The touch controller of claim 1, wherein:
the first one or more frequencies of the second set of frequencies identified as first low-noise frequencies are different from any frequencies in the first set of frequencies.

24. The touch controller of claim 2, wherein:
the second one or more frequencies of the first set of frequencies identified as second low-noise frequencies are different from any frequencies in the second set of frequencies.

* * * * *